(12) United States Patent
Matsushima et al.

(10) Patent No.: US 8,385,171 B2
(45) Date of Patent: Feb. 26, 2013

(54) INFORMATION RECORDING APPARATUS, AND CONTROL METHOD THEREFOR

(75) Inventors: Shuichiro Matsushima, Tokyo (JP); Yasushi Kasai, Tokyo (JP); Hirofumi Honda, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 641 days.

(21) Appl. No.: 12/266,816

(22) Filed: Nov. 7, 2008

(65) Prior Publication Data

US 2009/0125928 A1    May 14, 2009

(30) Foreign Application Priority Data

Nov. 9, 2007 (JP) ................. 2007-292484
Nov. 9, 2007 (JP) ................. 2007-292485

(51) Int. Cl.
G11B 5/58 (2006.01)
H04N 5/225 (2006.01)
H04N 5/76 (2006.01)
G06F 13/00 (2006.01)
G06F 13/28 (2006.01)

(52) U.S. Cl. ........... 369/53.42; 348/207.1; 348/231.1; 348/231.7; 348/231.99; 711/115

(58) Field of Classification Search ............ 720/697; 369/53.42, 53.12; 348/231.99, 231.1, 231.7, 348/231.9, 207.1
See application file for complete search history.

(56) References Cited

U.S. PATENT DOCUMENTS

| 7,065,590 | B2* | 6/2006 | Kitagawa .............. 710/5 |
| 7,508,424 | B2* | 3/2009 | Hayashi .......... 348/231.2 |
| 2004/0049692 | A1 | 3/2004 | Okamoto |
| 2005/0268127 | A1* | 12/2005 | Shiba et al. ......... 713/320 |
| 2006/0109754 | A1 | 5/2006 | Iijima |

FOREIGN PATENT DOCUMENTS

| JP | 2000-115669 | 4/2000 |
| JP | 2004-21669 | 1/2004 |
| JP | 2004-228991 | 8/2004 |
| JP | 2005-51682 | 2/2005 |
| JP | 2006-148723 | 6/2006 |

* cited by examiner

*Primary Examiner* — Joseph Haley
*Assistant Examiner* — Nicholas Lee
(74) *Attorney, Agent, or Firm* — Canon U.S.A., Inc., IP Division

(57) ABSTRACT

According to an embodiment of the present invention, there is provided an information recording apparatus, such as a digital camera, arranged to record information on a detachably mountable storage medium, such as for example to record video data on the storage medium. In one version of the apparatus, when a connection of an AC adapter is cancelled, the storage medium is detected by a storage medium detection unit, and in a case where the storage medium is not mounted to the mounting unit, a warning is issued, for example in an audio output unit or a display unit. Accordingly, the user can find out that the storage medium is not mounted before the digital camera has been brought outside for use. Thus, it may be possible to prevent a failure in which the user first realizes that they forgot to mount the storage medium only when they are already away from home.

8 Claims, 24 Drawing Sheets

FIG. 3

| PORT A | PORT B | PORT C | TERMINAL TO BE SELECTED |
|---|---|---|---|
| H | L | H | TERMINAL A (BATTERY) |
| L | H | H | TERMINAL B (AC POWER SOURCE) |
| H | H | L | TERMINAL C (CHARGING) |

* H: High, L: Low

FIG. 4

| PORT A | PORT B | PORT C | TERMINAL TO BE SELECTED |
|---|---|---|---|
| H | L | L | TERMINAL A (BATTERY) |
| L | H | L | TERMINAL B (AC POWER SOURCE) |
| H | H | L | TERMINAL B (AC POWER SOURCE) |

* H: High, L: Low

FIG. 20

| 2501 | 2502 | 2503 | 2504 |
|---|---|---|---|
| IMAGE FILE NAME | TRANSFER STATE | TRANSFER DESTINATION PATH | TRANSFER DATE TIME |

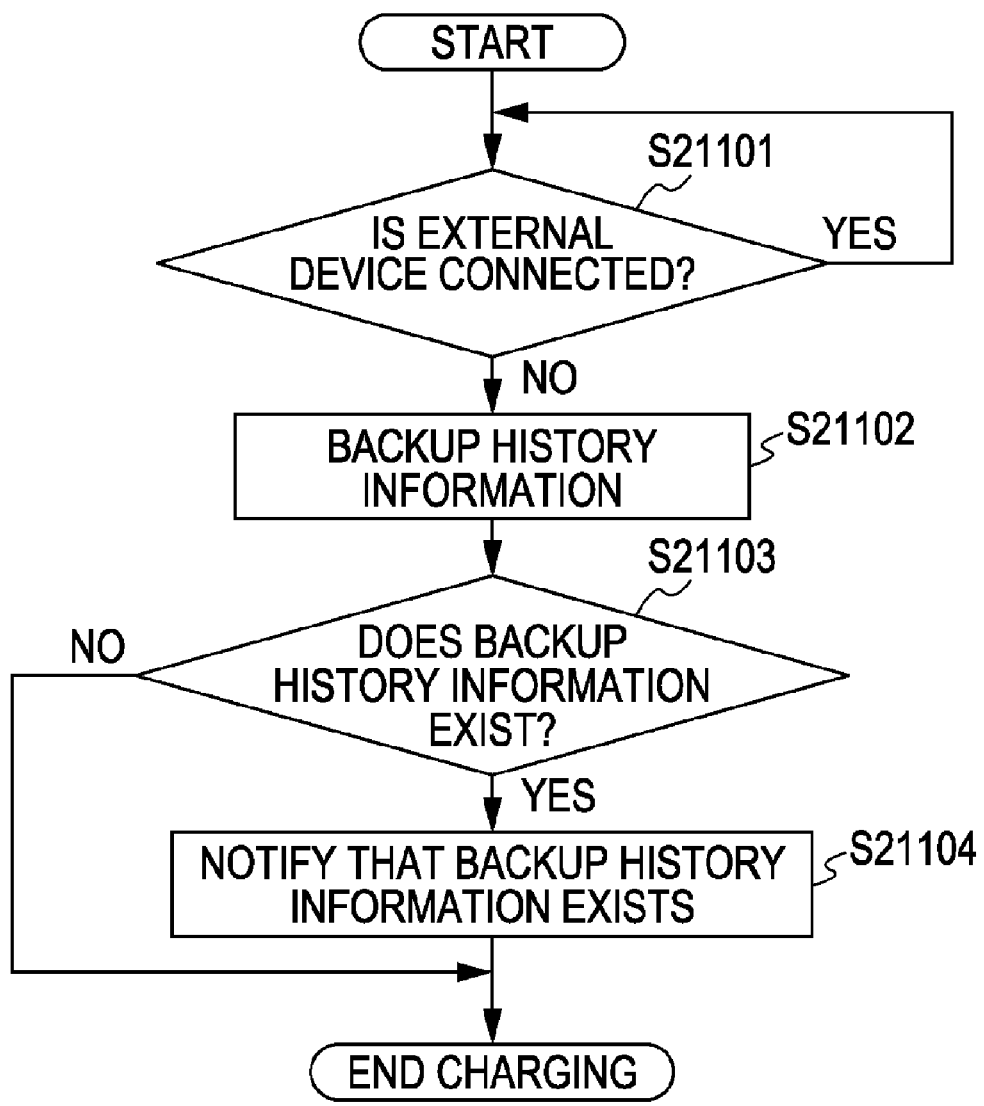

INFORMATION RECORDING APPARATUS, AND CONTROL METHOD THEREFOR

BACKGROUND OF THE INVENTION

1. Field of the Invention

The present invention generally relates to an information recording apparatus capable of recording data on a storage medium which is detachably mounted to a semiconductor memory, an optical disk, or the like, and a control method therefor.

2. Description of the Related Art

Many of the information processing apparatuses capable of taking in data and image pickup apparatuses such as digital cameras are often configured to record input data and captured video on a detachably mountable storage medium.

Examples of such a storage medium include, a magnetic tape and an optical disk to which random accesses can be made, an HDD (hard disk drive), a flash memory, and a memory card, which are used in many cases with a view to their storage capacity, access speed, impact resistance, etc.

Mounting and detachment of the storage medium can often be easily performed in such a camera. However, a user may forget to mount the detached storage medium to the camera in some cases.

In view of the above, according to a technology described in Japanese Patent Laid-Open No. 2000-115669, in order to inform that the storage medium is not mounted, for example, a warning is output even when a display unit is in a non-display state.

Also, even in the case where the storage medium is mounted, if the remaining capacity amount is small it may be difficult to adequately perform the image pickup.

In addition, for example, in a case where the storage medium is replaced, if a type of the storage medium is not checked carefully, a performance of the storage medium may be not satisfactory as compared with a performance demanded by the recording apparatus such as a capacity or a recording speed.

As to the above, according to a technology described in Japanese Patent Laid-Open No. 2006-148723, a performance of a recording rate of an external storage medium is detected and an optimal recording mode corresponding to the performance is selected to perform the recording processing.

However, in a case where such a temporal storage medium is used, the user may need to perform a so-called backup operation for transferring images from the storage medium to an external storage medium and a deletion operation for deleting the backed-up images. This is because if these operations are not performed, the free space of the temporal storage medium may run out, and the situation may occur where the next image pickup cannot be performed.

Also, when the deletion operation is performed for securing the free space of the storage medium, the situation may occur where a battery is excessively consumed while the user is away from home, or an image the user wishes to save may need to be deleted.

The following technologies are disclosed as generally related to the backup operation to the external storage medium and the deletion operation.

Japanese Patent Laid-Open No. 2005-51682 discloses a technology of outputting, in a case where there is an image which has not been processed in the backup operation, a message for urging the user to perform the backup of the image.

In addition, Japanese Patent Laid-Open No. 2004-21669 discloses a technology of urging the user to pay attention so that the operation is not interrupted during the backup operation.

In addition, Japanese Patent Laid-Open No. 2004-228991 discloses a technology of sequentially automatically deleting the transferred images.

However, according to the technology described in Japanese Patent Laid-Open No. 2000-115669, it may occur that a warning is output for the first time when a power source is turned ON immediately before the camera is used, and thus when it is found that the storage medium is not mounted while the user is away from home, image pickup cannot be performed unless the detached storage medium is at hand.

In addition, according to the technology described in Japanese Patent Laid-Open No. 2006-148723, the performance determination is performed also for the first time when the power source is turned ON immediately before the camera is used.

According to the technology described in Japanese Patent Laid-Open No. 2005-51682, the user is urged to perform the backup of the image which has not been processed in the backup operation, and according to the technology described in Japanese Patent Laid-Open No. 2004-21669, the backup operation is aimed to be executed with certainty. That is, these technologies generally do not relate to deletion of the backed-up images. In addition, according to the technology described in Japanese Patent Laid-Open No. 2005-51682 and also the technology described in Japanese Patent Laid-Open No. 2004-21669, no opportunity is provided to the user for checking the recordable capacity of the storage medium until the power source is turned ON to actually start the image pickup.

For that reason, according to these technologies, the situation may occur where the image pickup cannot be adequately performed because the free space of the storage medium is running out or the deletion operation for securing the capacity of the storage medium has not been performed, or the user may realize the necessity of the deletion operation only for the first time when the power source is turned ON.

Furthermore, according to the technology described in Japanese Patent Laid-Open No. 2004-21669, the connection typically cannot be cancelled until all the backup operations are completed, and thus the technology may not provide superior usability as the user may miss an unexpected photo opportunity.

In addition, according to the technology described in Japanese Patent Laid-Open No. 2004-228991, the transferred images are automatically deleted, but it can be difficult to find out whether a non-transferred or transferred image exists, and an image the user wishes to save may also be automatically deleted. Thus, the technology may not provide superior usability. Instead, on the occasion of the deletion operation on the recorded images, the user may prefer to be able to arbitrarily decide which image is deleted or not.

In addition, according to the technology described in Japanese Patent Laid-Open No. 2004-228991, until the power source is turned ON to actually start the image pickup, no opportunity may otherwise be provided to the user for checking the recordable capacity of the storage medium. For that reason, although the transferred images are automatically deleted, the user may only realize the necessity of the deletion operation for the first time when the power source is turned ON and as the desired free space is running out. Therefore, according to the technology described in Japanese Patent Laid-Open No. 2004-228991, it may be difficult for the user to satisfactorily avoid the situation where the free space of the storage medium is running out and the image pickup cannot

SUMMARY OF THE INVENTION

In one aspect of the present invention, a warning is appropriately provided to a user that is related to, for example, one or more of forgetting to mount a storage medium, shortage of the remaining free space amount of the storage medium, and insufficiency of a recording performance of the storage medium, to prevent such a situation where the user cannot immediately record data or pick up an image outdoors.

In addition, in another aspect of the invention, the present invention provides, for example, an information recording apparatus and the like which can provide an opportunity to appropriately delete a backed-up image in an image pickup apparatus so that a situation where image pickup cannot be performed as there is no free space in the storage medium, or a situation where a deletion operation on an image needs to be performed for securing the free space of the storage medium, is avoided.

In one aspect of the invention, a notification about a deficiency related to the storage medium is not provided at a time when the user wishes to record data or pick up an image outdoors, but instead the notification is provided at a time when the recording apparatus is brought to the outside.

In one embodiment of the present invention, there is provided an information recording apparatus arranged to record information on a detachably mountable storage medium, the information recording apparatus including: a main power source switch; a detection unit arranged to detect a connection state between the information recording apparatus and an external device; and a notification unit arranged to notify a state of the storage medium in a case where disconnection of the external device is detected by the detection unit even when the main power source switch is in an OFF state.

In one aspect of the invention, such a situation may be prevented where the defectiveness of the recording state is only realized for the first time at the timing of recording the data or picking up the image, and it is thus possible to perform improved recording processing.

Further features of the present invention will become apparent from the following description of exemplary embodiments with reference to the attached drawings.

BRIEF DESCRIPTION OF THE DRAWINGS

FIG. 3 illustrates a relation between a port state and a power source selection switch in the power source circuit of the digital camera according to an embodiment of the present invention.

FIG. 4 illustrates a relation between the port state and the power source selection switch in the power source circuit of the digital camera according to an embodiment of the present invention after completion of full charge.

FIG. 20 illustrates an embodiment of a format of backup history information which the digital camera according to an embodiment of the present invention may record on the storage medium.

FIG. 26 is a flowchart for describing an embodiment of a processing sequence for notifying that the backed-up image exists in a case where connection of the external device is cancelled from the digital camera according to an embodiment of the present invention.

DESCRIPTION OF THE EMBODIMENTS

Embodiments of the present invention will be described with reference to the drawings.

Figure 1:
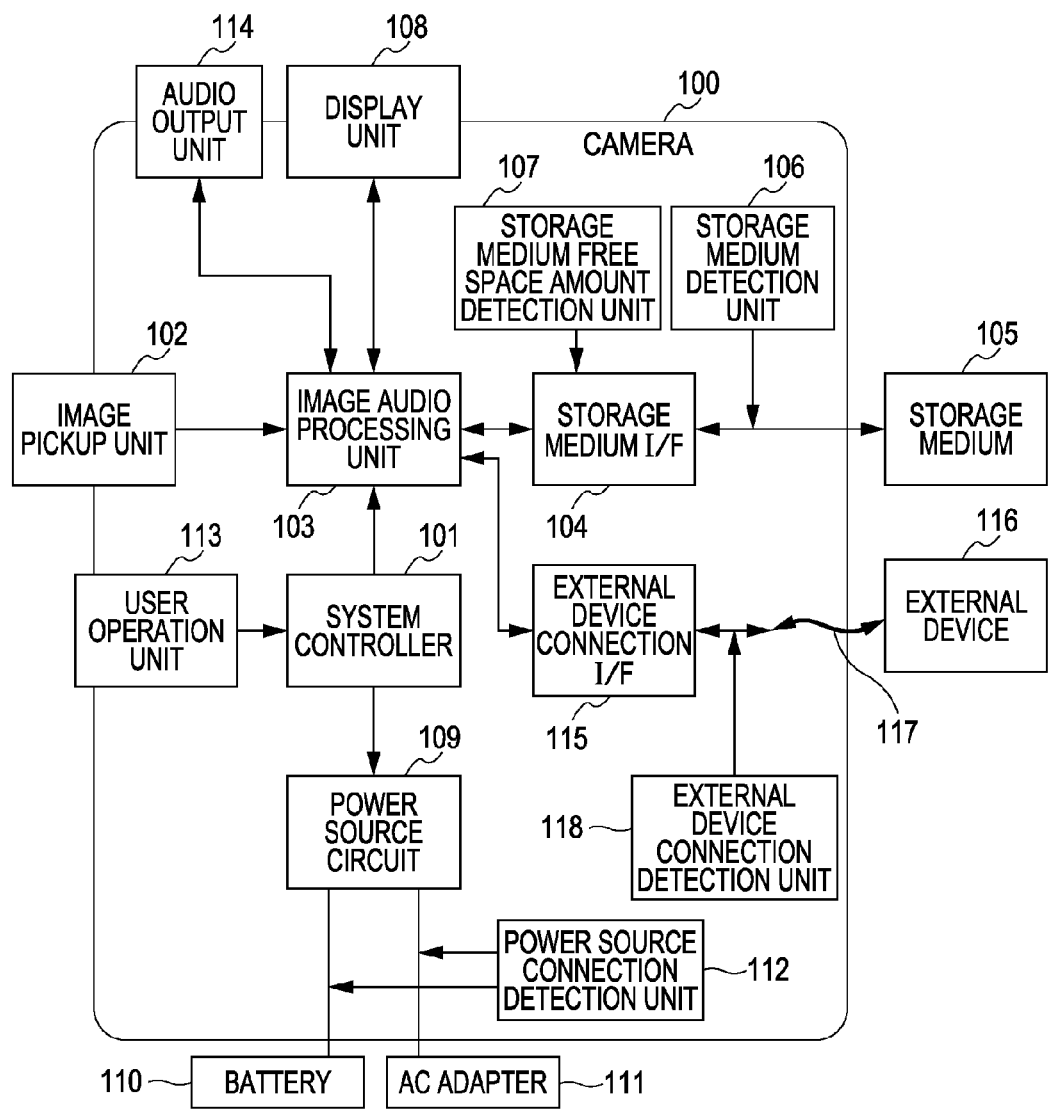
FIG. 1 illustrates a system configuration of a digital camera according to an embodiment of the present invention.

FIG. 1 illustrates an embodiment of a system configuration of a digital camera 100 (hereinafter, referred to as camera 100) functioning as an image pickup apparatus, which is provided with an information recording apparatus. The camera 100 includes a plurality of function blocks which are illustrated in FIG. 1.

In the embodiment illustrated in FIG. 1, a system controller 101 functions as a control unit arranged to control an entire system. An image pickup unit 102 is arranged to pick up an image (still image or motion picture image). The image pickup unit 102 is composed of an optical system, a motor for controlling the optical system, an image pickup element, and the like. The image pickup unit 102 forms an optical image and performs photoelectric conversion. An image audio processing unit 103 may also be arranged to convert an electric signal from the image pickup unit 102 into digital data.

A storage medium interface 104 (storage medium IF) is arranged to record the digital data from the image audio processing unit 103 on a storage medium 105. The storage medium 105 is a storage medium that can be detachably mounted to a mounting part (not shown) for the storage medium of the camera 100 and records the digital data. The storage medium 105 comprises, for example, an SD card. A storage medium detection unit 106 is arranged to detect a mounted/detached state of the storage medium 105. A storage medium free space amount detection unit 107 is arranged to detect the data amount that can be recorded on the storage medium 105 (data recordable free space). It is noted that the storage medium detection unit 106 as depicted corresponds to an example of a suitable configuration of a storage medium detection unit according to an embodiment of the present invention, and the storage medium free space amount detection unit 107 as depicted corresponds to an example of a suitable configuration of a storage medium free space amount detection unit according to an embodiment of the present invention.

A display unit 108 comprises, for example, a TFT, a LCD, or the like, and is arranged to display, e.g., a video or the like captured by the image pickup unit 102. A power source circuit 109 is arranged to supply electric power sufficient for the operation of the camera 100 from a battery 110 or an AC adapter 111 into the camera 100. A power source connection detection unit 112 is arranged to detect a mounting state of the battery 110 and the AC adapter 111. It is noted that the power source connection detection unit 112 as depicted corresponds to an example of a suitable configuration of a power source detection unit according to an embodiment of the present invention.

A user operation unit 113 may enable various operations of the camera 100 by the user. An audio output unit 114 can output a warning for informing the user of the state of the inside of the camera 100, and an audio at the time of video reproduction. In addition, the warning and the state of the inside of the camera 100 can also be displayed on the display unit 108. It is noted that the audio output unit 114 and the display unit 108 as depicted correspond to an example of a suitable configuration of a notification unit according to an embodiment of the present invention.

An external device connection interface (external device connection IF) 115 for performing a connection to the outside connects the external device 116 and the camera 100 via a communication cable 117 in the present drawing. An external device connection detection unit 118 is adapted to detect the connection state of the camera 100 with the external device 116. It is noted that the external device connection detection unit 118 as depicted corresponds to an example of a suitable configuration of an external device connection detection unit according to an embodiment of the present invention.

In one version, when the video is recorded by using the above-described camera 100, first, outside light transmitting through an optical system in the image pickup unit 102 forms an optical image on a surface of an image pickup element, which is converted into an electric signal by the image pickup element. The electric signal is converted by the image audio processing unit 103 into digital data (image data) and the digital data is recorded on the storage medium 105. Also, when the digital data recorded on the storage medium 105 is reproduced, the data read out from the storage medium 105 is converted in to data which is optimal for the display in the image audio processing unit 103, and thereafter, displayed in the display unit 108.

In addition, as described above, the camera 100 may have the power source circuit 109 built therein. The power source circuit 109 can supply electric power for operating the camera 100 from either side of the detachably mountable battery 110 or the AC adapter 111 for converting a commercial power source into direct current. Then, the electric power at a plurality of voltage values generated in the power source circuit 109 is supplied to an IC in the system. Furthermore, the power source circuit 109 can charge the battery 110 by using a built-in charging circuit 202. Hereinafter, a detail of the power source circuit 109 will be described.

Figure 2:
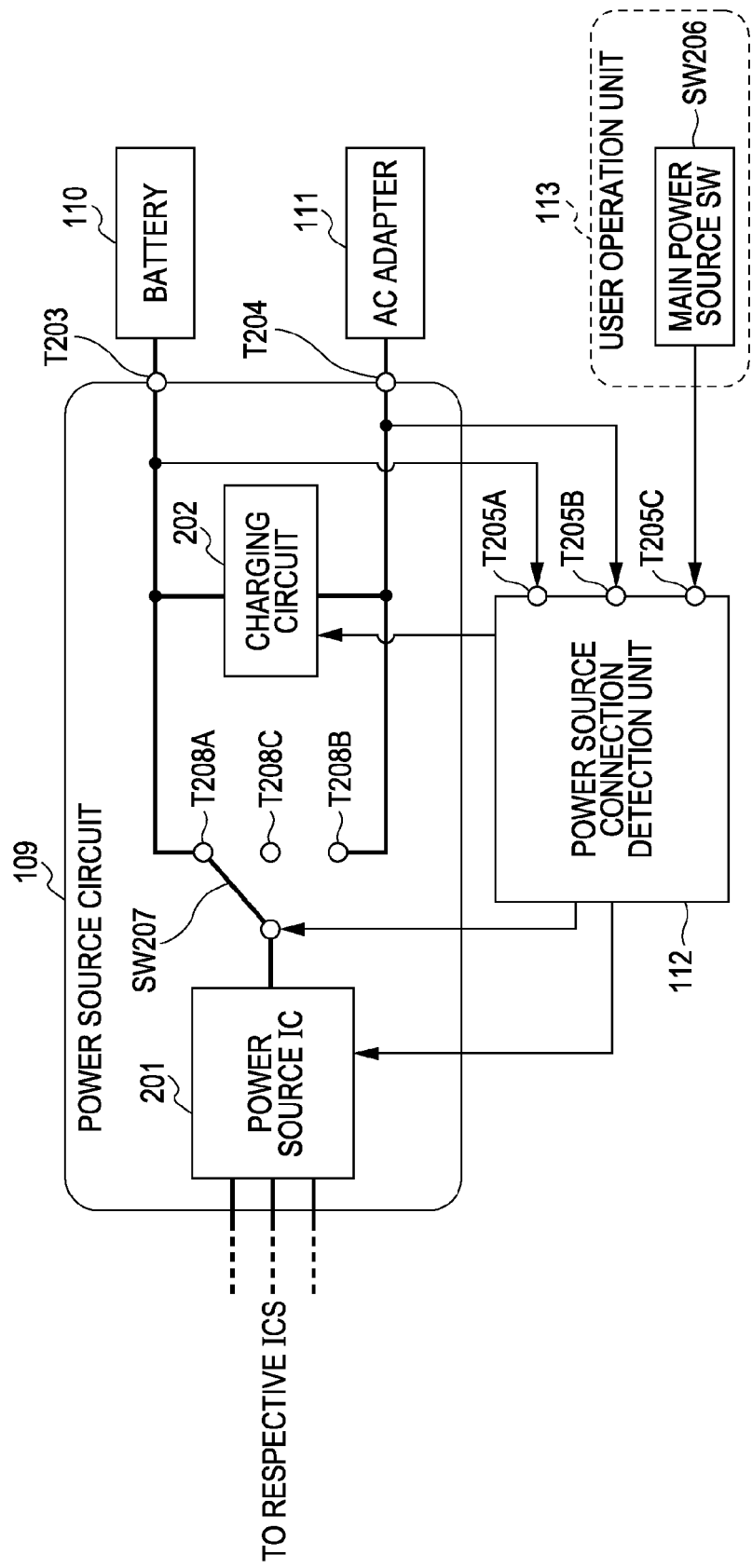
FIG. 2 is an explanatory diagram for describing a power source circuit of the digital camera according to an embodiment of the present invention.

A detailed configuration and operation of the power source circuit 109 according to one embodiment will be described by using FIG. 2. The power source circuit 109 includes a power source IC 201 adapted to generate the respective voltages and the charging circuit 202, and is connected to the power source connection detection unit 112 described above. The battery 110 supplies electric power while being connected (mounted) to a connection part A (T203) in the power source circuit 109. The AC adapter 111 supplies electric power from the outside while being connected to a connection part B (T204) in the power source circuit 109.

The power source connection detection unit 112 detects the connection state of the respective power sources in accordance with a voltage state of the bus which connects the power source circuit 109 and the battery 110 and the AC adapter 111. In a case where the voltage is applied to the bus (that is, in a case where the connection of the power source is established), the voltage state is High. In a case where the voltage is not applied to the bus (that is, in a case where the connection of the power source is cancelled), the voltage state is Low. Then, as a signal in accordance with the voltage state is input to a port A (T205A) and a port B (T205B) of the power source connection detection unit 112, the power source connection detection unit 112 detects the connection state of the power source. It is noted that on the basis of the signal input to the port A (T205A), the connection or cancellation of the battery 110 is detected, and on the basis of the signal input to the port B (T205B), the connection or cancellation of the AC adapter 111 is detected. Also, a main power source switch (SW206) in the user operation unit 113 is connected to a port C (T205C) of the power source connection detection unit 112. In the main power source switch (SW206), when the SW 206 is turned ON, the voltage state is High, and when the SW 206 is turned OFF, the voltage state is Low. With this configuration, the power source connection detection unit 112 detects the state of the main power source switch (SW206). It is noted that with the main power source switch (SW206), it is possible to switch over the recording mode, the reproduction mode, the stop mode, and the like in accordance with the operation performed by the user.

The power source connection detection unit 112 also performs a switching operation of a power source selection switch (SW207) through a determination related to the information on the above-described ports A to C. An embodiment of a relation between the state of the ports A to C and a terminal to be selected by the power source selection switch (SW207) is illustrated in FIG. 3. In FIG. 3, in a case where the battery 110 is connected and the AC adapter 111 is not connected while the main power source switch (SW206) is in an ON state, the camera 100 is driven by the battery. The power source selection switch (SW207) is connected to a terminal A (T208A).

In addition, in a case where the battery 110 is not connected and the AC adapter 111 is connected while the main power source switch (SW206) is in the ON state, the camera 100 is driven by the AC adapter power source. The power source selection switch (SW207) is connected to a terminal B (T208B).

In addition, in a case where the battery 110 is connected and the AC adapter 111 is connected while the main power source switch (SW206) is in an OFF state, the power source selection switch (SW207) is connected to a neutral terminal C (T208C). In this case, the charging mode is established in which the battery 110 is charged by way of the power source of the AC adapter 111.

Next, an embodiment of a relation between the state of the ports A to C and the terminal to be selected by the power source selection switch (SW207) in a state where charging of the battery 110 is completed is illustrated in FIG. 4. In FIG. 4, in a case where the battery 110 is connected and the AC adapter 111 is not connected while the main power source switch (SW206) is in the OFF state, the power source selection switch (SW207) is connected to the terminal A (T208A).

In addition, in a case where the battery 110 is not connected and the AC adapter 111 is connected while the main power source switch (SW206) is in the OFF state, the power source selection switch (SW207) is connected to the terminal B (T208B).

In addition, in a case where the battery 110 is connected and the AC adapter 111 is connected while the main power source switch (SW206) is in the OFF state, the power source selection switch (SW207) is connected to the terminal B (T208B).

As described above, according to the present embodiment, it is possible to switch over the electric power source from two or more power sources, and the connection state of the power source may be detected on the basis of the voltage of the bus. In addition to the above-described mode, a method may be adopted such that a mechanical switch is provided to the connection part A (T203) and the connection part B (T204) to detect the connection of the power source on the basis of the switch state.

Next, an embodiment of processing of the camera 100 for notifying that the storage medium is not mounted at a time when the AC adapter 111 is detached while the battery 110 is being charged, or after the charging is ended, will be described.

Figure 5:
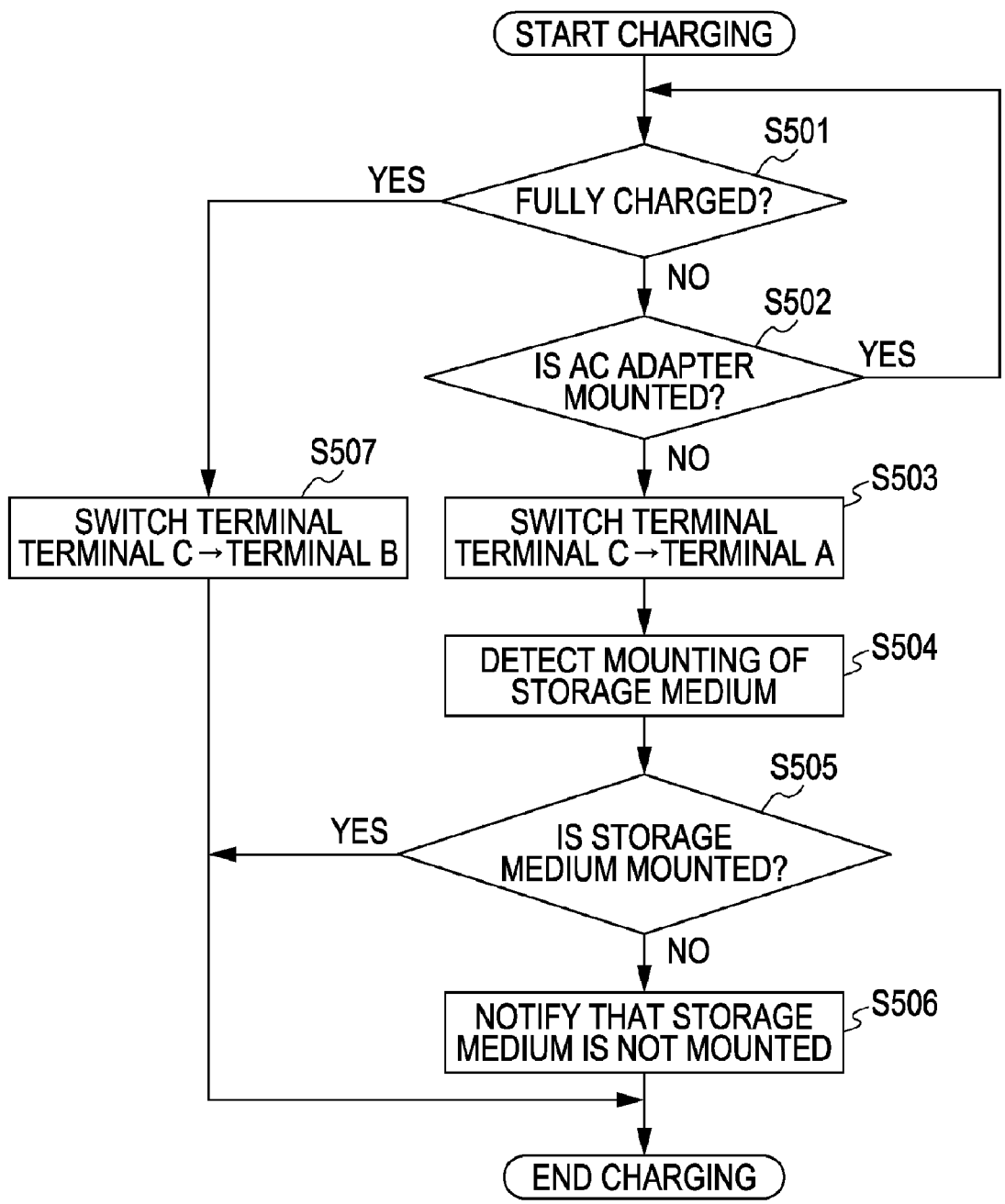
FIG. 5 is a flowchart for describing an embodiment of a processing sequence for performing a notification indicating that a storage medium is not connected at a time when an AC adapter is detached while the digital camera according to an embodiment of the present invention is being charged.

First, FIG. 5 is a flowchart for describing an embodiment of the processing sequence in a case where the AC adapter 111 is detached while the battery 110 is being charged in the camera 100.

In step S501, the system controller 101 is adapted to monitor the charging state after the charging start. When the battery is fully charged (YES in step S501), processing advances to step S507, where the power source connection detection unit 112 switches the power source selection switch (SW207) from the terminal C to the terminal B to end the charging. That is, the mode is switched from the charging mode to the AC adapter power source drive.

When the charging is not yet ended (NO in step S501), processing advances to step S502, where the system controller 101 allows the power source connection detection unit 112 to check the mounting state of the AC adapter 111 (the state of the port B).

In step S502, when the AC adapter 111 is mounted (YES in step S502), the processing is returned to the charging state check (step S501). On the other hand, when the AC adapter 111 is not mounted, it is determined that the AC adapter 111 is detached (NO in step S502), and processing advances to step S503, where the system controller 101 allows the power source connection detection unit 112 to switch the power source selection switch (SW207) from the terminal C to the terminal A. That is, the mode is switched to the battery drive.

In this manner, according to the present embodiment, in accordance with the detection result of the power source connection detection unit 112, the power source selection switch (SW207) is switched over.

Next, processing advances to steps S504 and S505, where the system controller 101 allows the storage medium detection unit 106 to detect the mounting state of the storage medium 105. In a case where the storage medium 105 is mounted (YES in step S505), the charging is ended. On the other hand, in a case where the storage medium 105 is not mounted (NO in step S505), the processing is advanced to step S506 to notify the user that the storage medium 105 is not mounted.

Figure 6:
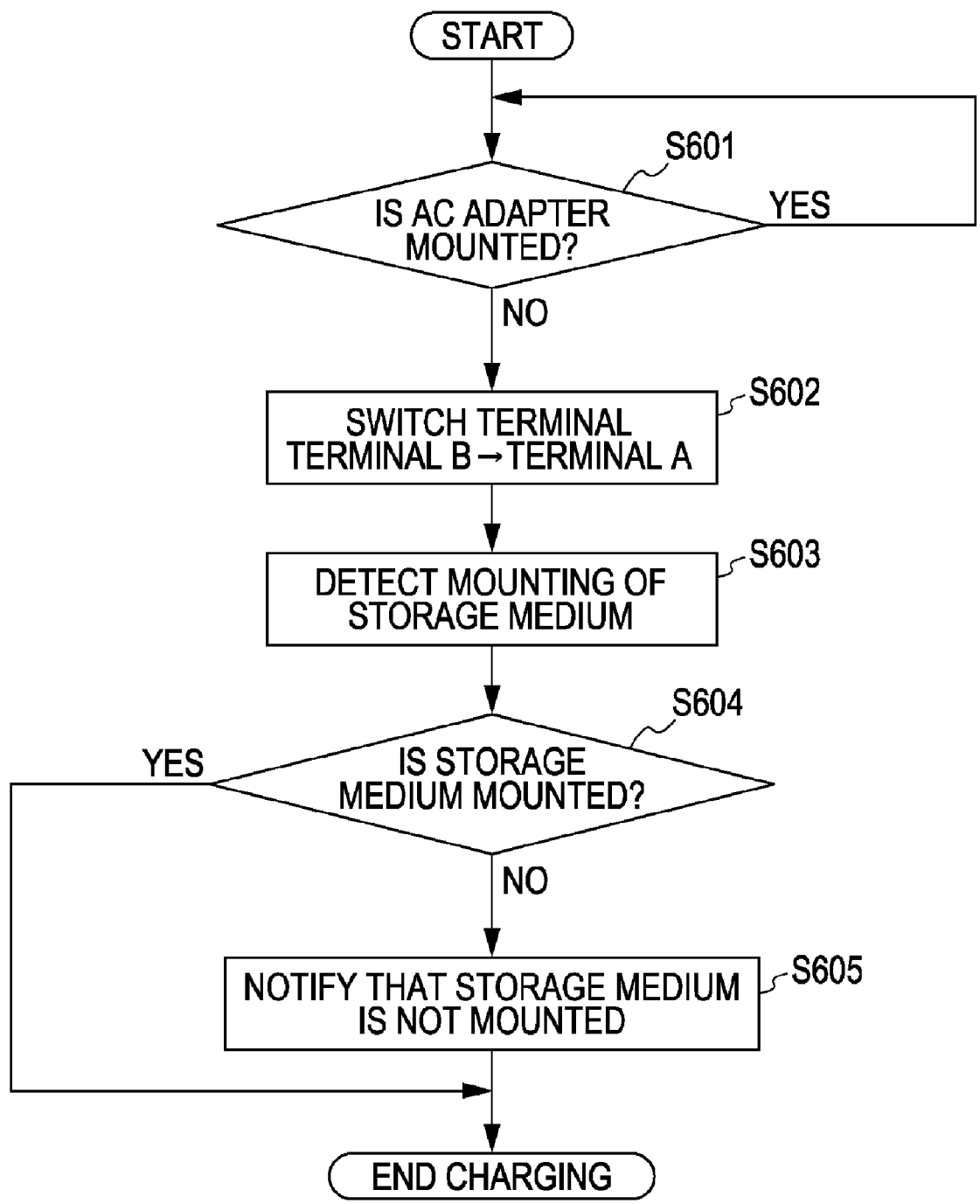
FIG. 6 is a flowchart for describing an embodiment of a processing sequence for performing a notification indicating that the storage medium is not connected at a time when the AC adapter is detached after the digital camera according to an embodiment of the present invention is charged.

Next, FIG. 6 is a flowchart for describing an embodiment of a process sequence in a case where the AC adapter 111 is detached after the charging is ended.

First, in step S601, the system controller 101 allows the power source connection detection unit 112 to check the mounting state of the AC adapter 111. It is noted that at this time, the main power source switch (SW206) is in the OFF state.

When the AC adapter 111 is mounted (YES in step S601), monitoring of the mounting state of the AC adapter 111 is continued. On the other hand, when the AC adapter 111 is not mounted (NO in step S601), it is determined that the AC adapter 111 is detached, and processing advances to step S602, where the power source connection detection unit 112 switches the power source selection switch (SW207) from the terminal B to the terminal A. That is, the mode is switched to the battery drive.

Next, processing advances to steps S603 and S604, where similarly to steps S503 and S504 described above, the system controller 101 allows the storage medium detection unit 106 to detect the mounting state of the storage medium 105. In a case where the storage medium 105 is mounted (YES in step S604), the charging is ended. On the other hand, in a case where the storage medium 105 is not mounted (NO in step s604), the processing is advanced to step S605. Even when the main power source switch (SW206) remains in the OFF state, the user is notified that the storage medium 105 is not mounted. After elapse of a certain period of time, the notification is ended, and the normal power source OFF state is established.

Here, an embodiment of a notification method for notifying the user that the storage medium is not mounted (that is, specific modes in steps S606 and S705 described above) will be described.

The camera 100 has the audio output unit 114 adapted to output the audio, and with this configuration, it is possible to urge the user to pay attention while the buzzer or the warning alarm is output. In addition to the above, it may be possible to notify the user with certainty that the storage medium is not mounted by way of an audio guidance previously stored in the internal recording medium of the camera 100, for example, by announcing "medium is not mounted".

In addition, the camera 100 has the display unit 108, and it is possible to urge the user to pay attention by temporarily displaying a message on the display unit 108 or flashing a display unit (light emitting unit) (not shown) for informing the internal state of the camera 100.

It is noted that it is also possible for the user to arbitrarily cancel the above-described function of notifying that the storage medium is not mounted.

As described above, according to an aspect of the present embodiment, in the camera 100, while the battery 110 is being charged or after the charging is ended, at a time when the AC adapter 111 is detached, even when the main power source switch (SW206) is in the OFF state, the detection of the storage medium 105 can be performed, and in a case where the storage medium 105 is not connected, the user may be notified of that effect.

Accordingly, with this configuration, at a time before the user turns on the power source of the camera 100 for the image pickup, and also at a time before the user brings the camera 100 to the outside, it is possible for the user to know that the storage medium 105 is unconnected.

Thus, by adopting the above-described configuration, it may be possible for the user to avoid a situation where image pickup fails when the user is out the door because the storage medium 105 is unconnected.

In particular, it may be the case that the power source is supplied via the AC power supply in a situation where the camera is used or charged in the house, and the power source is supplied from the battery 110 while being cut off from the AC power source when the camera is used outside the house. In view of the above-described circumstances, the camera 100 described according to the present embodiment provides the advantage in which before a problem occurs, the user may be appropriately notified that the storage medium 105 is not connected.

Next, a second embodiment of the present invention will be described. According to the present embodiment, a description will be provided of the processing of the camera 100 for notifying that the remaining capacity of the storage medium is small at a time when the AC adapter 111 is detached while the battery 110 is being charged or after the charging is ended. It is noted that aspects of the configuration of the camera according to the present embodiment are similar to that of the first embodiment and thus a detailed description thereof is being omitted.

Figure 7:
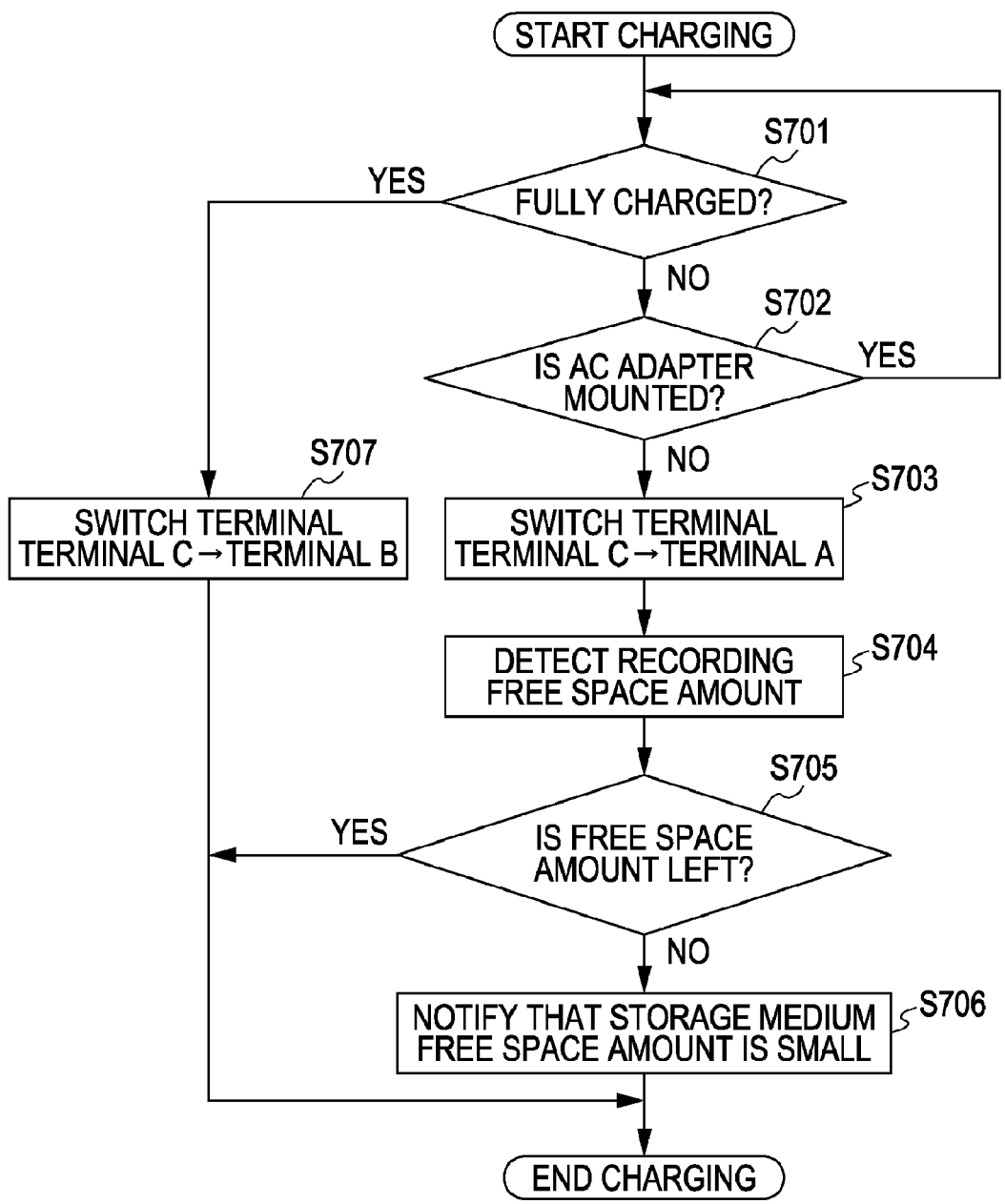
FIG. 7 is a flowchart for describing an embodiment of a processing sequence for performing a notification indicating that the remaining capacity of the storage medium is small at a time when the AC adapter is detached while the digital camera according to an embodiment of the present invention is being charged.

FIG. 7 is a flowchart for describing an embodiment of a processing sequence in a case where the AC adapter 111 is detached while the battery 110 is being charged in the camera 100.

In step S701, the system controller 101 is adapted to monitor the charging state after the charging start. When the battery is fully charged (YES in step S701), processing advanced to step S707, where the power source connection detection unit 112 switches the power source selection switch (SW207) from the terminal C to the terminal B to end the charging. That is, the mode is switched from the charging mode to the AC adapter power source drive.

When the charging is not yet ended (NO in step S701), processing advanced to step S702, where the system controller 101 allows the power source connection detection unit 112 to check the mounting state of the AC adapter 111 (the state of the port B).

In step S702, when the AC adapter 111 is mounted (YES in step S702), the processing is returned to the charging state check (step S701). On the other hand, when the AC adapter 111 is not mounted (NO in step S702), it is determined that the AC adapter 111 is detached, and processing advances to step S703, where the system controller 101 allows the power source connection detection unit 112 to switch the power source selection switch (SW207) from the terminal C to the terminal A. That is, the mode is switched to the battery drive.

Next, processing advances to steps S704 and S705, where the system controller 101 allows the storage medium free space amount detection unit 107 to detect the recording capacity (recording free space amount) of the storage medium 105. In a case where the detected recording free space amount is equal to or larger than a reference value (YES in step S705), the charging is ended. On the other hand, in a case where the detected recording free space amount is smaller than the reference value (NO in step S705), the processing is advanced to step S706, and the user is notified that the recording free space amount of the storage medium 105 is small. It is noted that the decision method for the above-described reference value will be described below.

Figure 8:
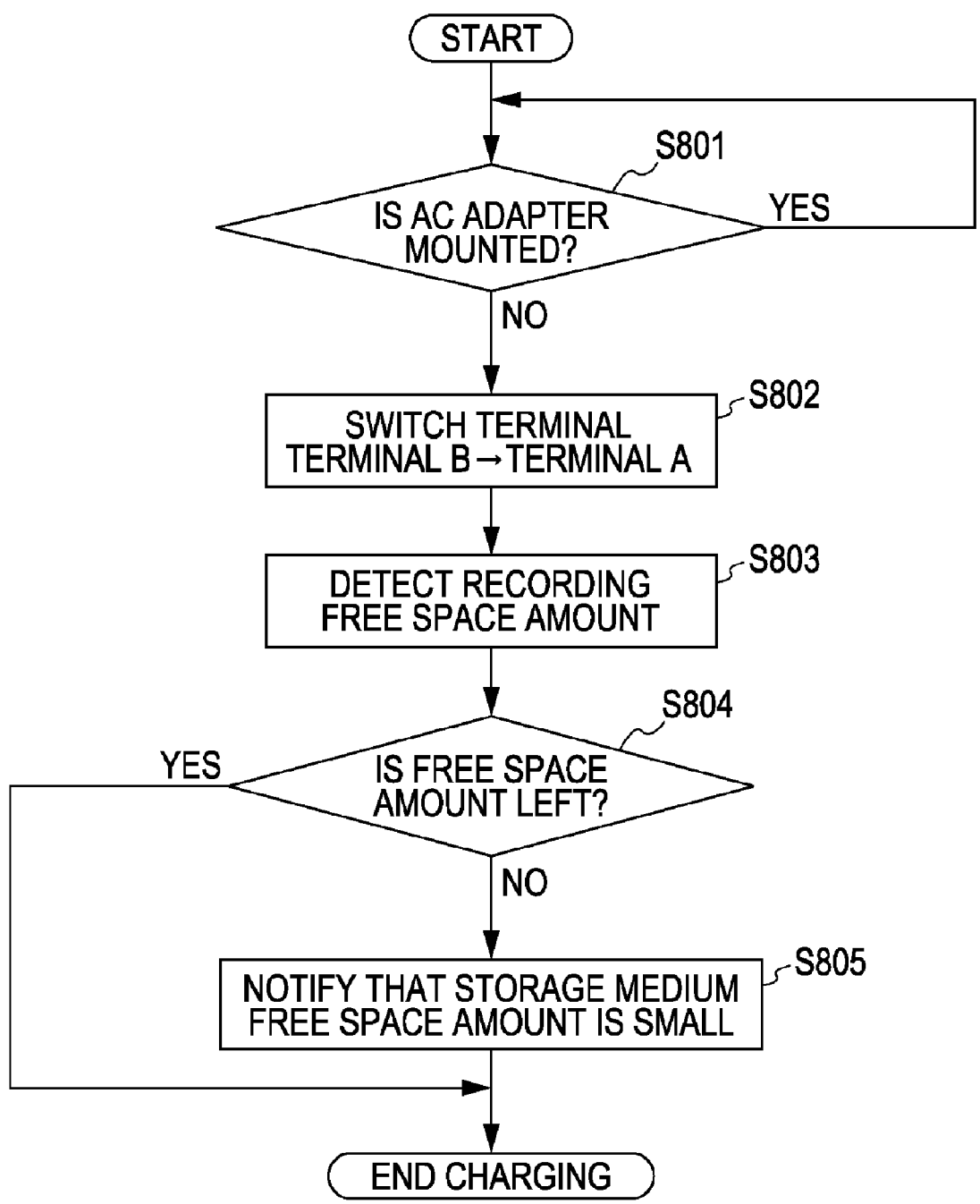
FIG. 8 is a flowchart for describing an embodiment of a processing sequence for performing a notification indicating that the remaining capacity of the storage medium is small at a time when the AC adapter is detached after the digital camera according to an embodiment of the present invention is charged.

Next, FIG. 8 is a flowchart for describing an embodiment of a process sequence in a case where the AC adapter 111 is detached after the charging is ended.

First, in step S801, the system controller 101 allows the power source connection detection unit 112 to check the mounting state of the AC adapter 111.

When the AC adapter 111 is mounted (YES in step S801), monitoring of the mounting state of the AC adapter 111 is continued. On the other hand, when the AC adapter 111 is not mounted (NO in step S801), it is determined that the AC adapter 111 is detached, and processing advances to step S802, where the power source connection detection unit 112 switches the power source selection switch (SW207) from the terminal B to the terminal A. That is, the mode is switched to the battery drive.

Next, processing advances to steps S803 and S804, where similarly to steps S703 and S704 described above, the system controller 101 allows the storage medium free space amount detection unit 107 to detect the recording capacity (recording free space amount) of the storage medium 105. In a case where the detected recording free space amount is equal to or larger than the reference value (YES in step S804), the charging is ended. On the other hand, in a case where the detected recording free space amount is smaller than the reference value (NO in step S804), the processing is advanced to step S805, and the user is notified that the recording free space amount of the storage medium is small.

Here, the reference value used at the time of the determination on the recording free space amount of the storage medium 105 (in step S704 or S804) will be described. In one embodiment, the reference value used for determining the recording free space amount of the storage medium 105 may be, for example, by way of a ratio to the total capacity such as 10% or lower of the recording capacity of the entire storage medium or a fixed value such as the remaining capacitance value of 5 MB. Also, it is possible to make a definition by way of the number of recordable picked-up images in the case of a digital still camera and the number of recordable contents such as a recording time (hour) in the case of a digital video camera.

It is noted that the notification method of notifying the user that the recordable remaining capacity is small is similar to that of the first embodiment, and the notification may be performed by using the audio output unit 114 and the display unit 108. To be more specific, an announcement "remaining capacity amount of medium is very small" or a message indicating that effect may be temporarily displayed.

It is noted that it is also possible for the user to arbitrarily cancel the above-described function of notifying that the capacity of the storage medium is small.

As described above, according to one aspect of the present embodiment, in the camera 100, while the battery 110 is being charged or after the charging is ended, at a time when the AC adapter 111 is detached, the detection of the capacity of the storage medium 105 is performed, and in a case where the remaining capacity is small, the user is notified of that effect.

Accordingly, with this configuration, at a time before the user turns on the power source of the camera 100 for the image pickup, and also at a time before the user brings the camera 100 to the outside, it is possible for the user to know that the remaining free space of the storage medium 105 is small.

Thus, by adopting the above-described configuration, it is possible for the user to avoid a situation in which the image pickup fails while being outside because the remaining free space of the storage medium 105 is small.

In particular, it may be the case that the power source is supplied via the AC power supply in a situation where the camera is used or charged in the house, and the power source may be supplied from the battery 110 while being cut off from the AC power source when the camera is used outside the house. In view of the above-described circumstances, the camera 100 described according to the present embodiment provides an advantage in that, before a problem occurs, the user may be appropriately notified that the remaining capacity is small.

Next, a third embodiment of the present invention will be described. According to the present embodiment, the processing of the camera 100 for notifying that the storage medium is not mounted at a time when the battery 110 is mounted, will be described. It is noted that aspects of the configuration of the camera according to the present embodiment are similar to those of the first embodiment, and thus a detail description thereof is being omitted.

Figure 9:
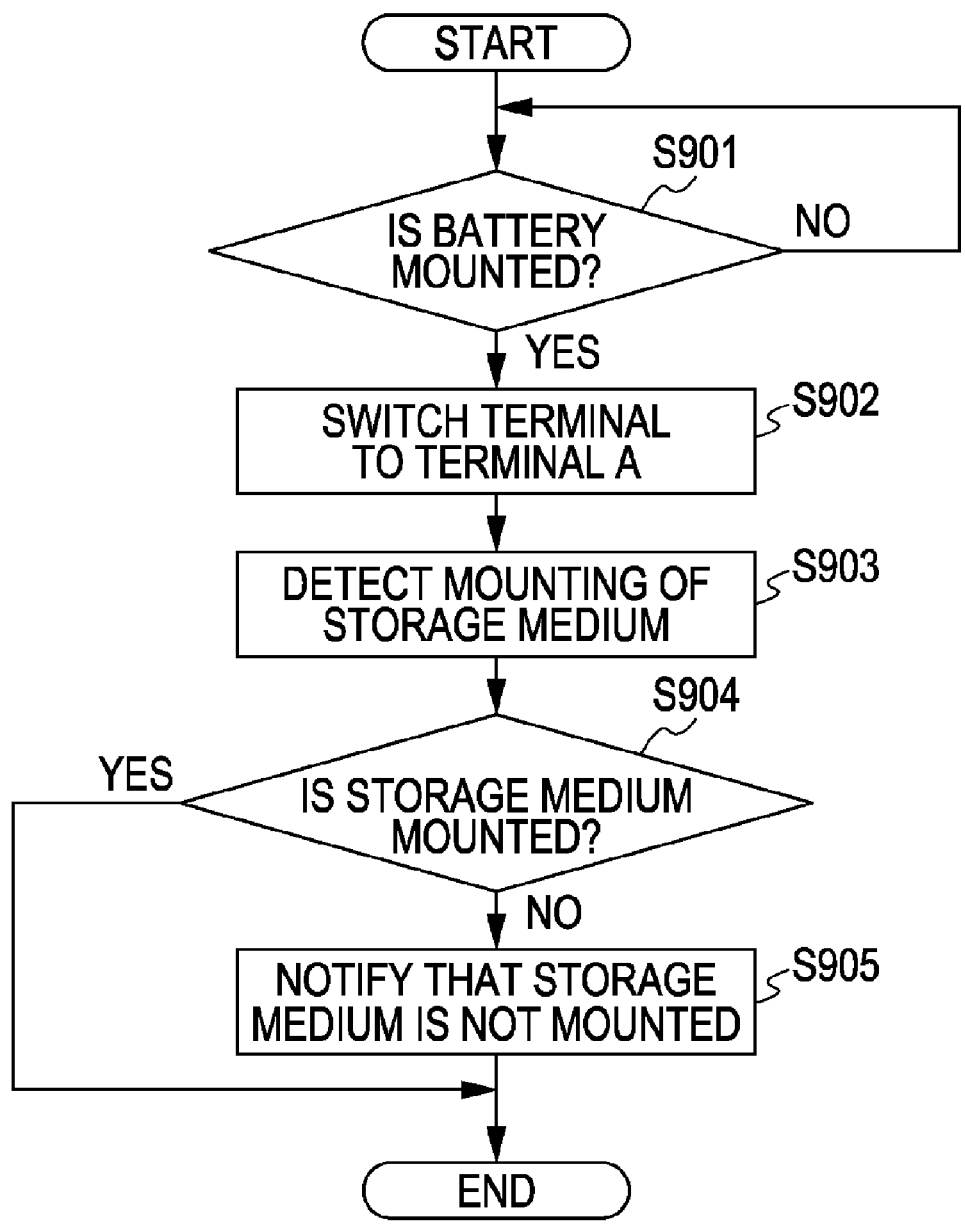
FIG. 9 is a flowchart for describing an embodiment of a processing sequence for performing a notification indicating that the storage medium is not connected at a time when a battery is mounted to the digital camera according to an embodiment of the present invention.

FIG. 9 is a flowchart for describing an embodiment of the processing sequence of the camera 100 for notifying that the storage medium is not mounted at a time when the battery 110 is mounted.

First, in step S901, the system controller 101 allows the power source connection detection unit 112 to check the port A (T205A) for checking the mounting state of the battery 110.

When the battery 110 is not mounted (the port A (T205A) is Low) (NO in step S901), monitoring of the mounting state of the battery 110 is continued (step S901). On the other hand, in a case where it is determined that the battery 110 is mounted (the port A (T205A) is High) (YES in step S901), processing advances to step S902, where the power source connection detection unit 112 switches the power source selection switch (SW207) from the terminal B to the terminal A.

Next, processing advances to steps S903 and S904, where the system controller 101 allows the storage medium detection unit 106 to detect the mounting state of the storage medium 105. In a case where the storage medium 105 is mounted (YES in step S904), the processing is ended. On the other hand, in a case where the storage medium 105 is not mounted (NO in step S904), the processing is advanced to step S905 to notify the user that the storage medium 105 is not mounted.

It is noted that the processing described above can be executed irrespective of the state of the main power source switch (SW207). In addition, in one version, the notification method as to the unmounting of the storage medium may be similar to that of the first embodiment, and therefore a description thereof is being omitted.

As described above, according to one aspect of the present embodiment, in the camera 100, the detection of the storage medium 105 is performed at a time when the battery 110 is mounted, and in a case where the storage medium 105 is not connected, the user is notified of that effect.

Accordingly, with this configuration, at a time before the user turns on the power source of the camera 100 for the image pickup and also at a time before the user brings the camera 100 to the outside, it is possible for the user to know that the storage medium 105 is unconnected.

Thus, by adopting the above-described configuration, it may be possible for the user to avoid a situation where the image pickup fails when the user is out the door because the storage medium 105 is unconnected.

It is further conceivable that there are many situations where the user brings the camera 100 to which the charged battery 110 is mounted, to the outside. In view of the above-described circumstances, the camera 100 described according to the present embodiment provides the advantage in which before a problem occurs, the user is appropriately notified that the storage medium 105 is not connected.

Next, a fourth embodiment of the present invention will now be described. According to the present embodiment, the processing of the camera 100 for notifying that the remaining capacity of the storage medium is small at a time when the battery 110 is mounted will be described. It is noted that aspects of the configuration of the camera according to the present embodiment may be similar to that of the first embodiment, and thus a detail description thereof is being omitted.

Figure 10:
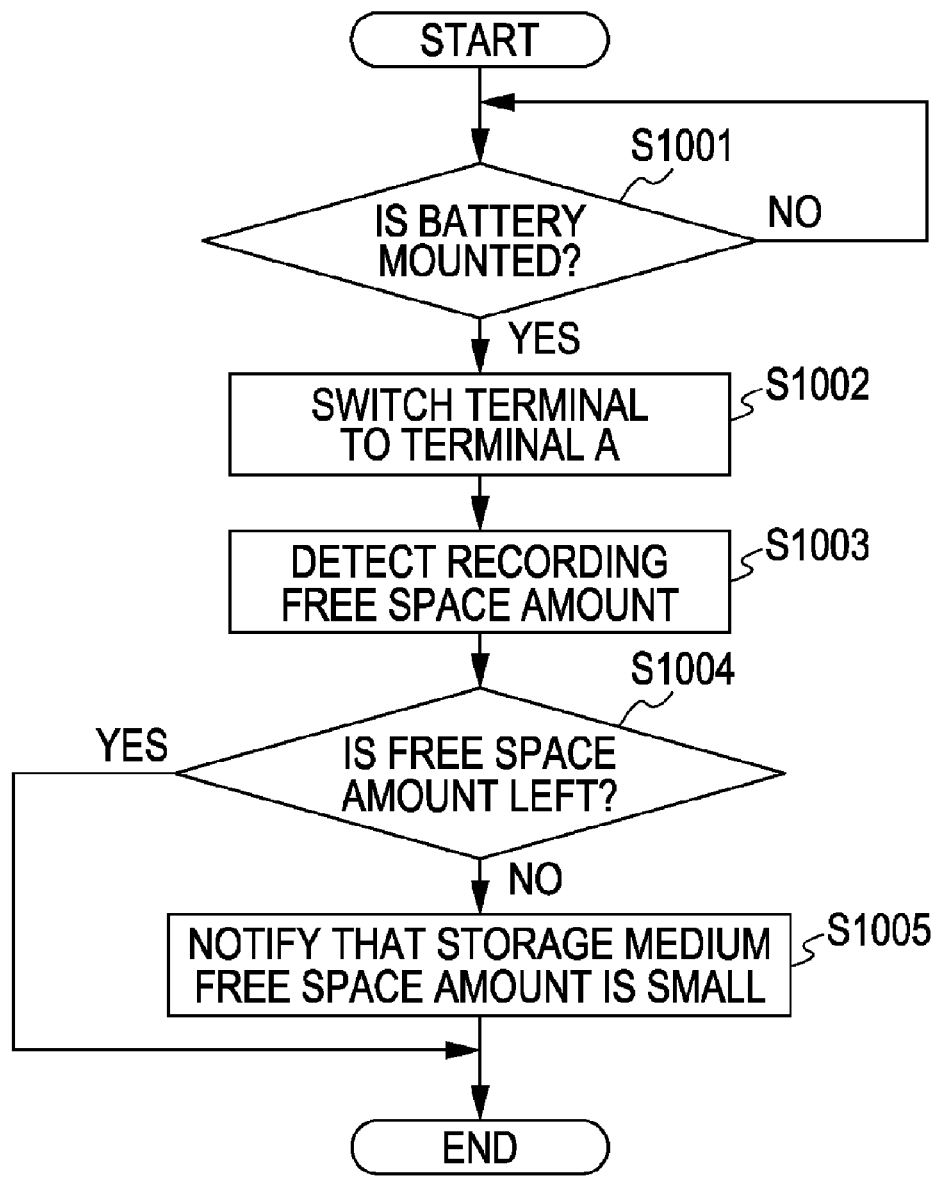
FIG. 10 is a flowchart for describing an embodiment of a processing sequence for performing a notification indicating that the remaining capacity of the storage medium is small at a time when the battery is mounted to the digital camera according to an embodiment of the present invention.

FIG. 10 is a flowchart for describing an embodiment of a processing sequence of the camera 100 for notifying that the remaining capacity of the storage medium is small at a time when the battery 110 is mounted.

First, in step S1001, the system controller 101 allows the power source connection detection unit 112 to check the port A (T205A) for checking the mounting state of the battery 110.

When the battery 110 is not mounted (the port A (T205A) is Low) (NO in step S1001), monitoring of the mounting state of the battery 110 is continued (step S1001). On the other hand, in a case where it is determined that the battery 110 is mounted (the port A (T205A) is High) (YES in step S1001), processing advances to step S1002, where the power source connection detection unit 112 switches the power source selection switch (SW207) from the terminal B to the terminal A.

Next, processing advances to steps S1003 and S1004, where the system controller 101 allows the storage medium free space amount detection unit 107 to detect the recording capacity (recording free space amount) of the storage medium 105. In a case where the detected recording free space amount is equal to or larger than the reference value (YES in step S1004), the processing is ended. On the other hand, in a case where the detected recording free space amount is smaller than the reference value (NO in step S1004), the processing is advanced to step S1005, and the user is notified that the recording free space amount of the storage medium 105 is small.

It is noted that, in one embodiment, the processing described above can be executed irrespective of the state of the main power source switch (SW207). In addition, in one version, the notification method of notifying the user that the recordable remaining capacity is small and the reference value used for determining the remaining amount of the storage medium may be similar to those of the second embodiment above, and thus a description thereof is being omitted.

As described above, according to one embodiment of the present embodiment, in the camera 100, the detection of the capacity of the storage medium 105 may be performed at a time when the battery 110 is mounted, and in a case where the remaining capacity of the storage medium 105 is small, the user may be notified of that effect.

Accordingly, with this configuration, at a time before the user turns on the power source of the camera 100 for the image pickup, and also at a time before the user brings the camera 100 to the outside, it is possible for the user to know that the remaining free space of the storage medium 105 is small.

Thus, by adopting the above-described configuration, it is possible for the user to avoid a situation where the image pickup fails while being outside because the remaining free space of the storage medium 105 is small.

Furthermore, it is conceivable that there are many situations where the user brings the camera 100 to which the charged battery 110 is mounted, to the outside. In one aspect, in view of the above-described circumstances, the camera 100 described according to the present embodiment provides the advantage in which before a problem occurs, the user is notified that the remaining capacity of the storage medium 105 is small.

Next, a fifth embodiment of the present invention will be described. According to the present embodiment, a description will be provided of the processing of the camera 100 for notifying that the storage medium 105 is not mounted at a time when the connection with the external device 116 is cancelled. It is noted that aspects of the configuration of the camera according to the present embodiment may be similar to that of the first embodiment, and thus a detail description thereof is being omitted.

Figure 11:
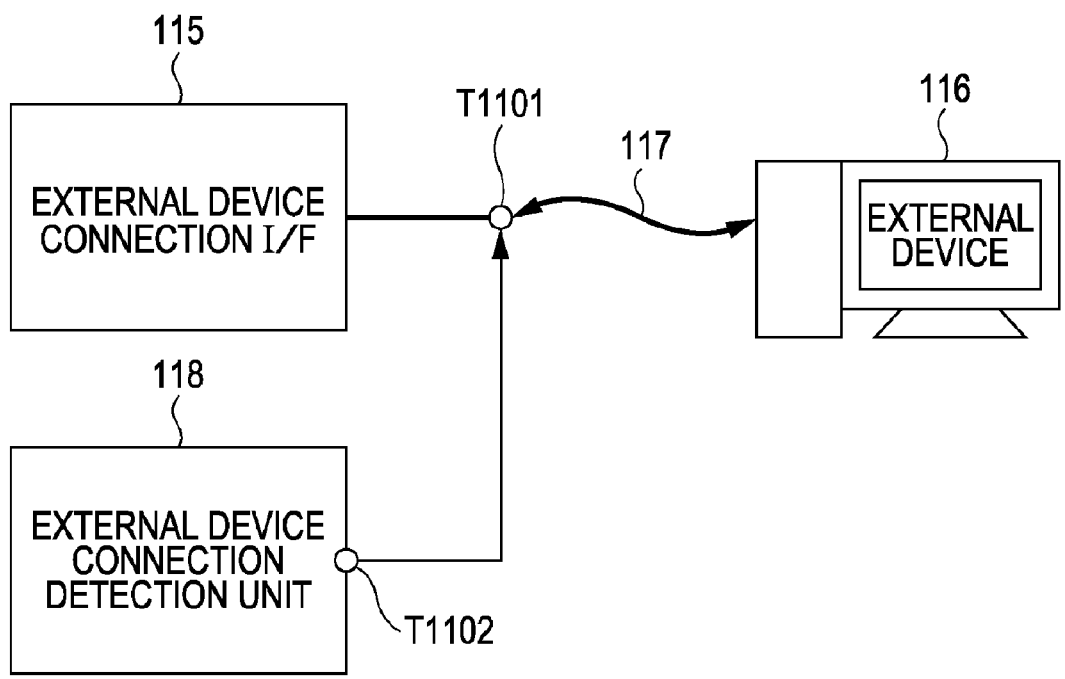
FIG. 11 is an explanatory diagram for describing an external device connection detection unit of the digital camera according to an embodiment of the present invention.

FIG. 11 is an explanatory diagram for describing a detail of an embodiment of the external device connection detection unit 118. The external device connection interface 115 is connected via an external device connection part (T1101) to the external device connection detection unit 118. Also, the external device 116 is connected via the communication cable 117 to the external device connection part (T1101) and connected to the external device connection detection unit 118.

The external device connection detection unit 118 is adapted to monitor the supply voltage state of the communication bus which connects the above-described respective units. In a case where the external device 116 is connected, the voltage state of a port D (T1102) is High, and in a case where the external device 116 is not connected, the voltage state is Low. Therefore, by detecting the voltage state, the external device connection detection unit 118 determines the connection state of the external device 116.

It is noted that in the embodiment described herein, the external device connection detection is determined on the basis of the supply voltage of the communication bus, but a method may also be adopted of detecting the external device connection on the basis of, for example, a state of a mechanical switch provided to the external device connection part (T1101).

Figure 12:
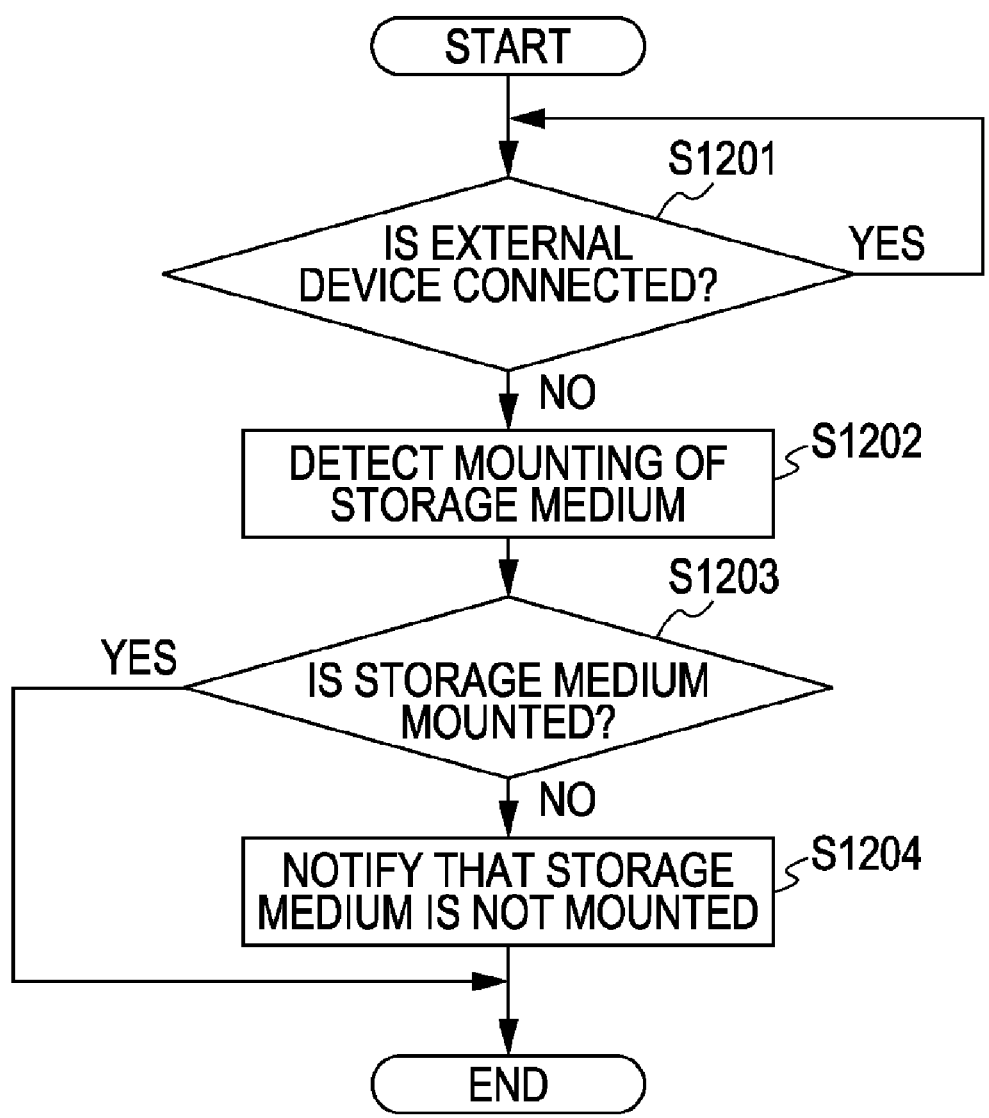
FIG. 12 is a flowchart for describing an embodiment of a processing sequence for performing a notification indicating that the storage medium is not connected at a time when connection of an external device from the digital camera according to an embodiment of the present invention is cancelled.

FIG. 12 is a flowchart for describing an embodiment of a process sequence for notifying the user that the storage medium is not mounted at a time when the connection with the external device 116 is cancelled in the camera 100.

First, in step S1201, the system controller 101 allows the external device connection detection unit 118 to check the connection state of the external device 116 (the port D (T1102)).

When the connection is established (the port D (T1102) is High) (YES in step S1201), the monitoring on the connection state of the external device 116 is continued. When the connection is not established (the port D (T1102) is Low) (NO in step S1201), processing advances to step S1202, as it is determined that the connection of the external device 116 is cancelled, and the system controller 101 allows the storage medium detection unit 106 to check the mounting state of the storage medium 105.

Next, processing advances to step S1203, and the system controller 101 determines whether the storage medium 105 is mounted. In a case where the storage medium 105 is mounted (YES in step S1203), the processing is ended. On the other hand, in a case where the storage medium 105 is not mounted (NO in step S1203), the processing is advanced to step S1204, and the system controller 101 notifies the user that the storage medium 105 is not mounted. It is noted that aspects of the notification method as to the unmounting of the storage medium may be similar to that of the first embodiment, and thus a description thereof is being omitted.

As described above, according to the present embodiment, at a time when the connection between the camera 100 and the external device 116 is cancelled, the detection of the storage medium 105 may be performed, and in a case where the storage medium 105 is not connected, the user may be notified of that effect.

Accordingly, with this configuration, at a time before the user turns on the power source of the camera 100 for the image pickup, and also at a time before the user brings the camera 100 to the outside, it is possible for the user to know that the storage medium 105 is unconnected.

Thus, by adopting the above-described configuration, it may be possible for the user to avoid a situation where the image pickup fails when the user is out the door because the storage medium 105 is unconnected.

In one version, the user may connect the camera 100 to the external device 116 such as a PC to perform a data back-up processing. When consideration is given to this case, there may be many situations where the user detaches the camera 100 from the external device 116 and brings the camera 100 to the outside. In view of the above-described circumstances, the camera 100 described according to the present embodiment provides the advantage in which before a problem occurs, the user is appropriately notified that the storage medium 105 is not connected.

Next, a sixth embodiment of the present invention will be described. According to the present embodiment, a description will be provided of the processing of the camera 100 for notifying that the remaining capacity of the storage medium is small at a time when the connection with the external device 116 is cancelled. It is noted that aspects of the configuration of the camera according to the present embodiment may be similar to that of the first embodiment, and thus a detail description thereof is being omitted.

Figure 13:
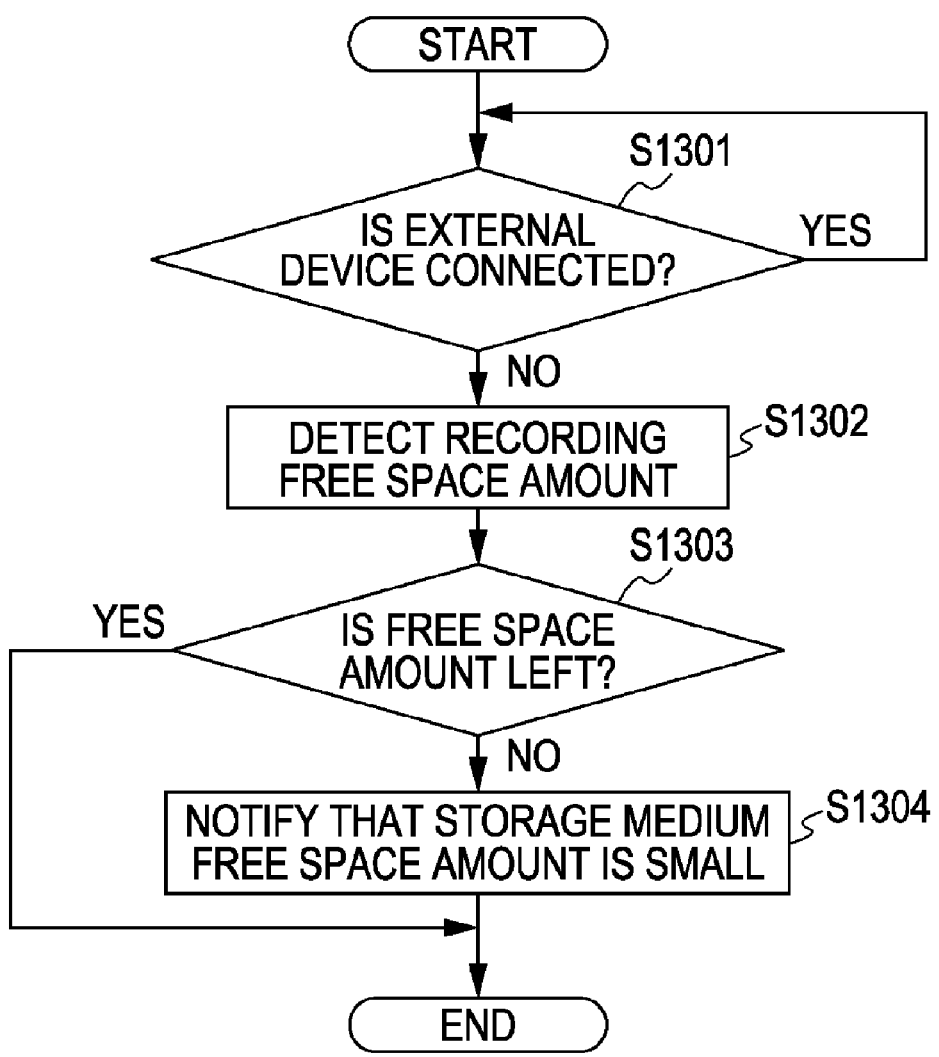
FIG. 13 is a flowchart for describing an embodiment of a processing sequence for performing a notification indicating that the remaining capacity of the storage medium is small at a time when connection of the external device from the digital camera according to an embodiment of the present invention is cancelled.

FIG. 13 is a flowchart for describing an embodiment of a process sequence for notifying the user that the remaining capacity of the storage medium 105 is small at a time when the connection with the external device 116 is cancelled in the camera 100.

First, in step S1301, the system controller 101 allows the external device connection detection unit 118 to check the connection state of the external device 116 (the port D (T1102)).

When the connection is established (the port D (T1102) is High) (YES in step S1301), the monitoring on the connection state of the external device 116 is continued. When the connection is not established (the port D (T1102) is Low) (NO in step S1301), processing advances to steps S1302 and S1303, as it is determined that the connection of the external device 116 is cancelled, and the system controller 101 allows the storage medium free space amount detection unit 107 to detect the recording capacity (recording free space amount) of the storage medium 105. In a case where the detected recording free space amount is equal to or larger than the reference value (YES in step S1303), the processing is ended. On the other hand, in a case where the detected recording free space amount is smaller than the reference value (NO in step S1303), the processing is advanced to step S1304, and the user is notified that the recording free space amount of the storage medium 105 is small. It is noted that aspects of the notification method of notifying the user that the recordable remaining capacity is small and the reference value used for determining the remaining amount of the storage medium may be similar to those of the second embodiment, and thus a description thereof is being omitted.

As described above, according to the present embodiment, at a time when the connection between the camera 100 and the external device 116 is cancelled, the detection of the capacity of the storage medium 105 may be performed, and in a case where the remaining amount of the storage medium 105 is small, the user may be notified of that effect.

Accordingly, with this configuration, at a time before the user turns on the power source of the camera 100 for the image pickup and also at a time before the user brings the camera 100 to the outside, it is possible for the user to know that the remaining free space of the storage medium 105 is small.

Thus, by adopting the above-described configuration, it may be possible for the user to avoid a situation where the image pickup fails while being outside because the remaining free space of the storage medium 105 is small.

The user may connect the camera 100 to the external device 116 such as a PC to perform the data back-up processing. When consideration is given to this case, there are many situations where the user detaches the camera 100 from the external device 116 and brings the camera 100 to the outside. In view of the above-described circumstances, the camera 100 described according to the present embodiment provides the advantage in which before a problem occurs, the user may be appropriately notified that the storage medium 105 is not connected.

Next, a seventh embodiment of the present invention will be described. According to the present embodiment, a description will be provided of the following processing of the camera 100. At a time when the AC adapter 111 is detached while the battery 110 is being charged or after the charging is ended, the detection of the storage medium is performed, and the information related to the writing speed of the storage medium is read out. Then, the performance determination as to the writing speed is performed, and in a case where the writing speed does not satisfy the recording rate of the camera 100, a warning is issued. It is noted that aspects of the configuration of the camera according to the present embodiment may be similar to that of the first embodiment, and thus a detail description thereof is being omitted.

Figure 14:
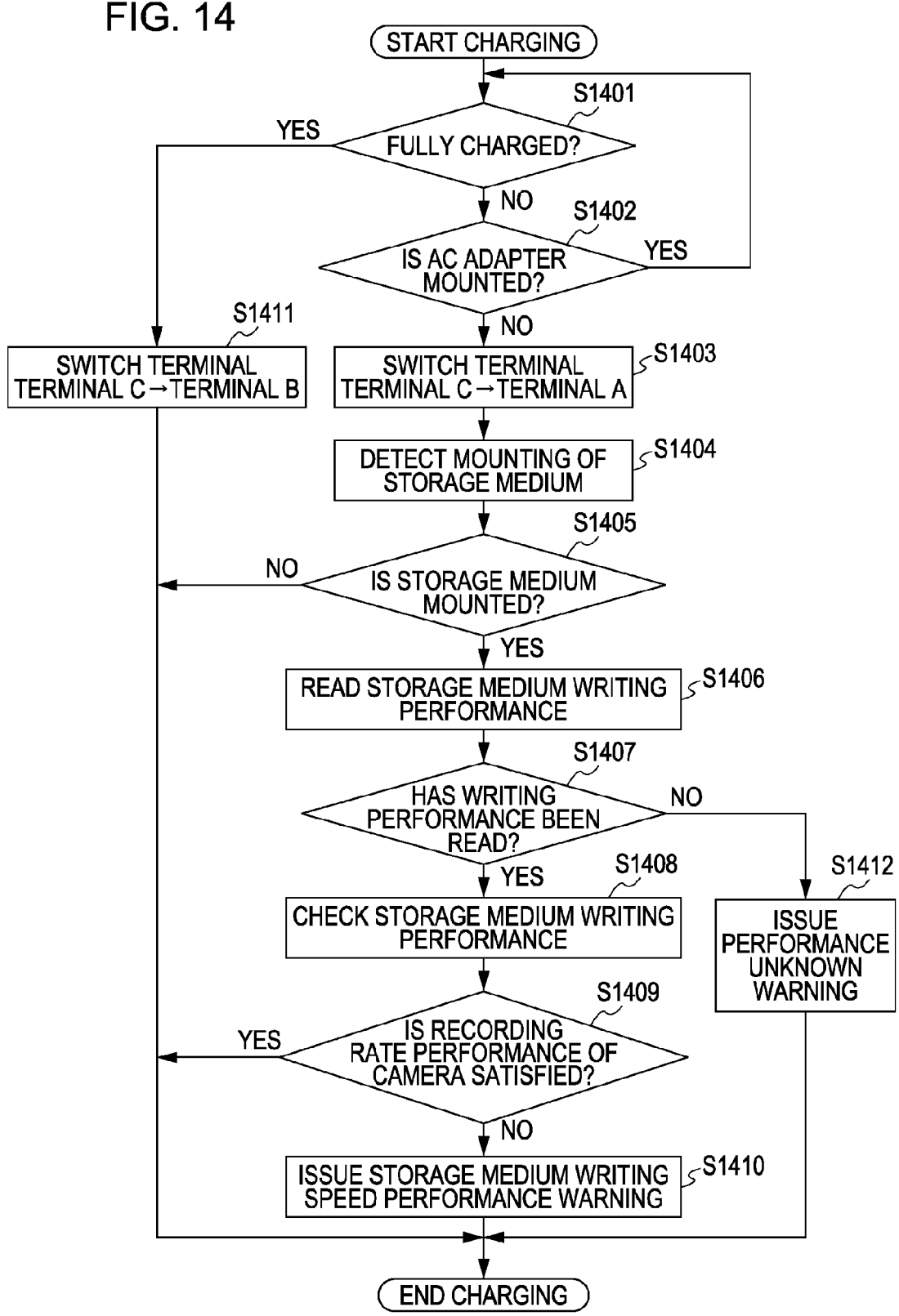
FIG. 14 is a flowchart for describing an embodiment of a processing sequence for, at a time when the AC adapter is detached while the digital camera according to an embodiment of the present invention is being charged, detecting the storage medium, reading out information related to a writing speed of the storage medium, performing a performance determination as to the writing speed, and notifying a warning in a case where the writing speed does not satisfy a predetermined recording rate performance.

FIG. 14 is a flowchart for describing an embodiment of a processing sequence in a case where the AC adapter 111 is detached while the battery 110 is being charged in the camera 100.

In step S1401, the system controller 101 is adapted to monitor the charging state after the charging start. When the battery is fully charged (YES in step S1401), processing advances to step S1411, where the power source connection detection unit 112 switches the power source selection switch (SW207) from the terminal C to the terminal B to end the charging. That is, the mode is switched from the charging mode to the AC adapter power source drive.

When the charging is not yet ended (NO in step S1401), processing advances to step S1402, where the system controller 101 allows the power source connection detection unit 112 to check the mounting state of the AC adapter 111 (the state of the port B).

In step S1402, when the AC adapter 111 is mounted (YES in step S1402), the processing is returned to the charging state check (step S1401). On the other hand, when the AC adapter 111 is not mounted (NO in step S1402), it is determined that the AC adapter 111 is detached, and processing advances to step S1403, where the system controller 101 allows the power source connection detection unit 112 to switch the power source selection switch (SW207) from the terminal C to the terminal A. That is, the mode is switched to the battery drive.

Next, processing advances to step S1404 and S1405, where the system controller 101 allows the storage medium detection unit 106 to detect the mounting state of the storage medium 105. In a case where the storage medium 105 is not mounted (NO in step S1405), the processing is ended, and in a case where the storage medium 105 is mounted (YES in step S1405), the processing is advanced to step S1406.

In step S1406, the system controller 101 reads out the performance information related to the writing speed of the storage medium 105 via the storage medium interface 104.

Next, processing advances to step S1407, where the system controller 101 determines whether the performance information related to the writing speed has been read out in step S1406. In a case where the performance information has been read out (YES in step S1407), the processing is advanced to step S1408, and in a case where the performance information has not been read out (NO in step S1407), the processing is advanced to step S1412.

In step S1408, the system controller 101 checks the read performance information related to the writing speed. Subsequently, processing advances to step S1409, where the system controller 101 determines whether the writing speed performance satisfies a predetermined performance. Then, in a case where the writing speed performance satisfies the predetermined performance (YES in step S1409), the processing is ended. In a case where the writing speed performance does not satisfy the predetermined performance (NO in step S1409), processing advances to step S1410, where the user is notified that the writing speed of the storage medium 105 does not satisfy the recording rate performance of the camera 100.

On the other hand, in a case where the performance information related to the writing speed has not been read out (NO in step S1407), in which processing advances to step S1412, the user is notified that the writing speed of the storage medium 105 is unknown in step S1407.

Figure 15:
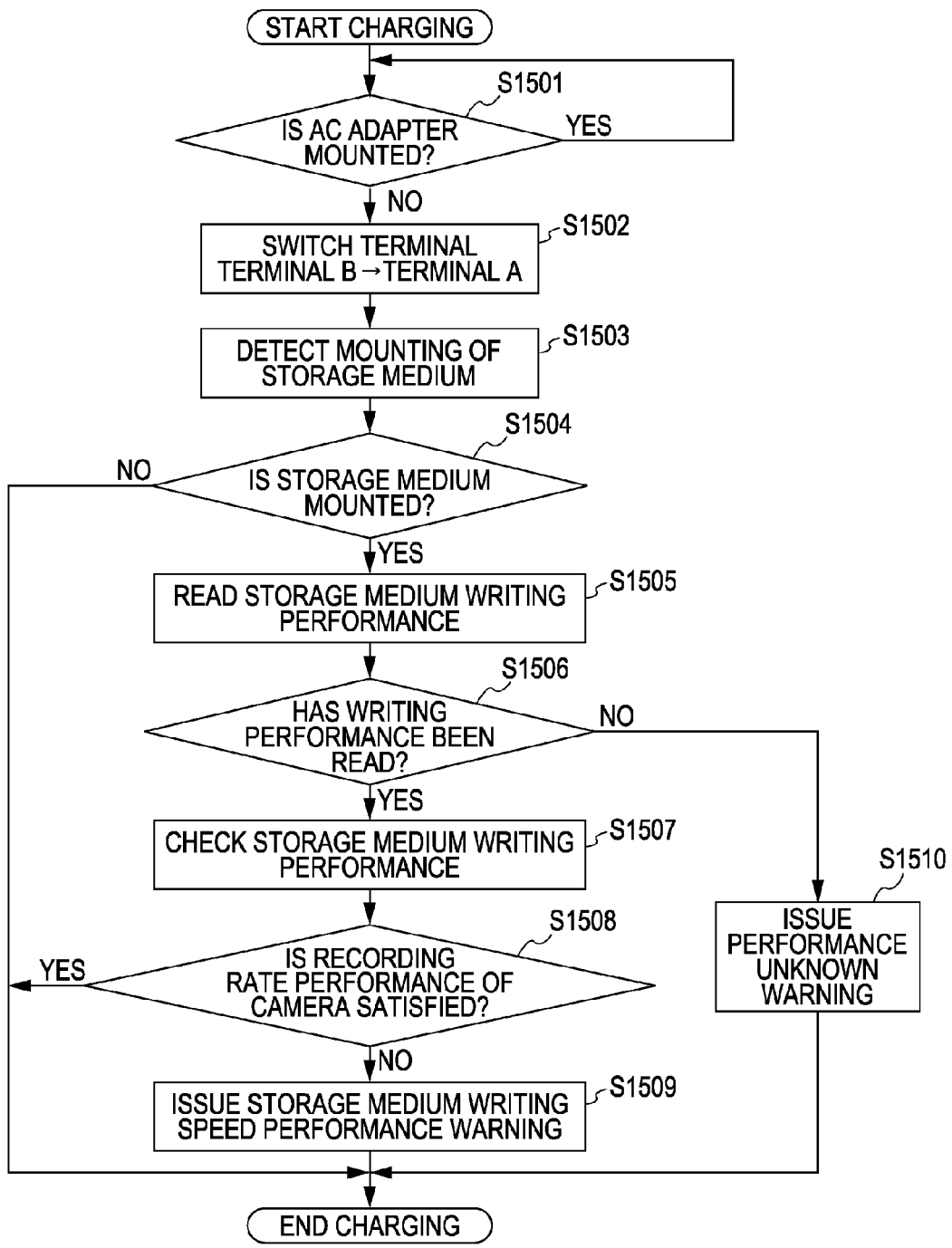
FIG. 15 is a flowchart for describing an embodiment of a processing sequence for, at a time when the AC adapter is detached after the digital camera according to an embodiment of the present invention is charged, detecting the storage medium, reading out the information related to the writing speed of the storage medium, performing the performance determination as to the writing speed, and notifying a warning in a case where the writing speed does not satisfy a predetermined recording rate performance.

Next, FIG. 15 is a flowchart for describing an embodiment of a process sequence in a case where the AC adapter 111 is detached after the charging is ended.

First, in step S1501, the system controller 101 allows the power source connection detection unit 112 to check the mounting state of the AC adapter 111.

When the AC adapter 111 is mounted (YES in step S1501), monitoring of the mounting state of the AC adapter 111 is continued. On the other hand, when the AC adapter 111 is not mounted (NO in step S1501), it is determined that the AC adapter 111 is detached, and processing is advanced to step S1502, where the power source connection detection unit 112 switches the power source selection switch (SW207) from the terminal B to the terminal A. That is, the mode is switched to the battery drive.

Next, processing advances to steps S1503 and S1504, where similarly to steps S1404 and S1405 described above, the system controller 101 allows the storage medium detection unit 106 to detect the storage medium mounting state. In a case where the storage medium 105 is not mounted (NO in step S1504), the processing is ended, and in a case where the storage medium 105 is mounted (YES in step S1504), the processing is advanced to step S1505.

In step S1505, the system controller 101 reads out the performance information related to the writing speed of the storage medium 105 via the storage medium interface 104.

Next, in step S1506, the system controller 101 determines whether the performance information related to the writing speed has been read out in step S1505. In a case where the performance information has been read out (YES in step S1506), the processing is advanced to step S1507, and in a case where the performance information has not been read out (NO in step S1506), the processing is advanced to step S1510.

In step S1507, the system controller 101 checks the read performance information related to the writing speed. Subsequently, processing advances to step S1508, where the system controller 101 determines whether the writing speed performance satisfies a predetermined performance. Then, in a case where the writing speed performance satisfies the predetermined performance (YES in step S1508), the processing is ended. In a case where the writing speed performance does not satisfy the predetermined performance (NO in step S1508), processing advances to step S1509, where the user is notified that the writing speed of the storage medium 105 does not satisfy the recording rate performance of the camera 100.

On the other hand, in a case where the performance information related to the writing speed has not been read out (NO in step S1506), processing advances to step S1510, and the user is notified that the writing speed of the storage medium 105 is unknown in this step.

Here, an embodiment of the notification method for notifying the user that the storage medium is not mounted (that is, specific modes in steps S1410, S1412, S1509, and S1510 described above) will be described.

In one version, the camera 100 has the audio output unit 114 adapted to output the audio, and with this configuration, it is possible to urge the user to pay attention while the buzzer or the warning alarm is output. In addition to the above, it may be possible to notify the user with certainty that the storage medium does not satisfy the recording rate performance of the camera 100 by way of an audio guidance previously stored in the internal recording medium of the camera 100, for example, by announcing "medium not satisfying the recording performance is mounted". Also, in a case where the performance related to the writing speed of the storage medium 105 cannot be read out, for example, it is possible to urge the user to pay attention by announcing "there is a possibility that video recording cannot be performed if a medium not satisfying the recording performance is mounted".

In addition, the camera 100 has the display unit 108, and it is possible to urge the user to pay attention by temporarily displaying a message on the display unit 108 or flashing the display unit (light emitting unit) (not shown) for informing the internal state of the camera 100.

It is noted that it may also be possible for the user to arbitrarily cancel the above-described function of notifying that the storage medium is not mounted.

As described above, according to the present embodiment, in the camera 100, while the battery 110 is being charged or after the charging is ended, at a time when the AC adapter 111 is detached, the detection of the storage medium 105 is performed and also the writing speed of the storage medium 105 is read out. Then, in a case where the writing speed does not satisfy the predetermined recording rate performance of the camera 100, the warning is issued.

Accordingly, with this configuration, at a time before the user turns on the power source of the camera 100 for the image pickup and also at a time before the user brings the camera 100 to the outside, it is possible for the user to know that the recording performance of the storage medium 105 is not sufficient.

Thus, by adopting the above-described configuration, it may be possible for the user to avoid a situation where the image pickup fails because the recording performance of the storage medium 105 is not sufficient.

In particular, it may be the case that the power source is supplied via the AC power supply in a situation where the camera is used or charged in the house, and the power source is supplied from the battery 110 while being cut off from the AC power source when the camera is used outside the house. In view of the above-described circumstances, the camera 100 described according to the present embodiment provides the advantage in which before a problem occurs, the user may be notified that the recording performance of the storage medium 105 is not sufficient.

Next, an eighth embodiment of the present invention will be described. According to the present embodiment, a description will be provided of the following processing of the camera 100. The detection of the storage medium is performed at a time when the battery 110 is mounted, and the information related to the writing speed of the storage medium is read out. Then, the performance determination as to the writing speed, and in a case where the writing speed does not satisfy the recording rate performance of the camera 100, a warning is issued. It is noted that aspects of the configuration of the camera according to the present embodiment may be similar to that of the first embodiment, and thus a detail description thereof is being omitted.

Figure 16:
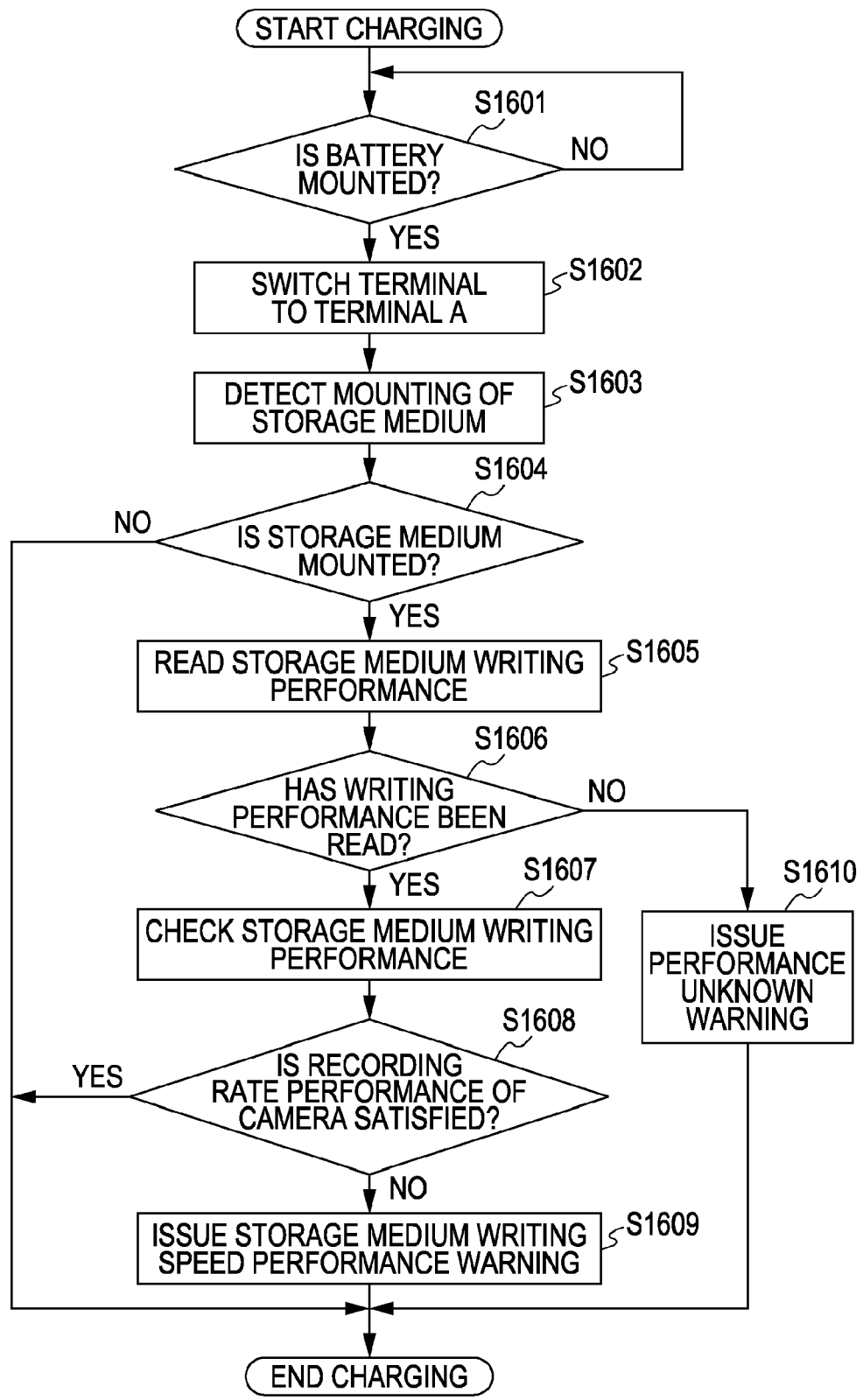
FIG. 16 is a flowchart for describing an embodiment of a processing sequence for, at a time when the battery is mounted to the digital camera according to an embodiment of the present invention, detecting the storage medium, reading out the information related to the writing speed of the storage medium, performing the performance determination as to the writing speed, and notifying a warning in a case where the writing speed does not satisfy a predetermined recording rate performance.

FIG. 16 is a flowchart for describing an embodiment of a process sequence for issuing a warning in a case where the writing speed does not satisfy the recording rate performance of the camera 100, after the detection of the storage medium is performed at a time when the battery 110 is mounted and the information related to the writing speed of the storage medium is read out.

First, in step S1601, the system controller 101 allows the power source connection detection unit 112 to check the port A (T205A) to check the mounting state of the battery 110.

When the battery 110 is not mounted (the port A (T205A) is Low) (NO in step S1601), monitoring of the mounting state of the battery 110 is continued (step S1601). On the other hand, in a case where it is determined that the battery 110 is mounted (the port A (T205A) is High) (YES in step S1601), processing advances to step S1602, where the power source connection detection unit 112 switches the power source selection switch (SW207) from the terminal B to the terminal A.

Next, processing advances to steps S1603 and S1604, where the system controller 101 allows the storage medium detection unit 106 to detect the mounting state of the storage medium 105. In a case where the storage medium 105 is not mounted (NO in step S1604), the processing is ended, and in a case where the storage medium 105 is mounted (YES in step 1604), the processing is advanced to step S1605.

In step S1605, the system controller 101 reads out the performance information related to the writing speed of the storage medium 105 via the storage medium interface 104.

Next, processing advances to step S1606, where the system controller 101 determines whether the performance information related to the writing speed has been read out in step S1605. In a case where the performance information has been read out (YES in step S1606), the processing is advanced to step S1607, and in a case where the performance information has not been read out (NO in step S1606), the processing is advanced to step S1610.

In step S1607, the system controller 101 checks the read performance information related to the writing speed. Subsequently, processing advances to step S1608, where the system controller 101 determines whether the writing speed performance satisfies a predetermined performance. Then, in a case where the writing speed performance satisfies the predetermined performance (YES in step S1608), the processing is ended. In a case where the writing speed performance does not satisfy the predetermined performance (NO in step S1608), processing advances to step S1609, where the user is notified that the writing speed of the storage medium 105 does not satisfy the recording rate performance of the camera 100.

On the other hand, in a case where the performance information related to the writing speed has not been read out (NO in step S1606), processing advances to step S1610, where the user is notified that the writing speed of the storage medium 105 is unknown. It is noted that aspects of the notification method for the situation where the writing speed of the storage medium 105 does not satisfy the recording rate performance of the camera 100 may be similar to that of the seventh embodiment, and thus a description thereof is being omitted.

As described above, according to the present embodiment, in the camera 100, the detection of the storage medium 105 may be performed at a time when the battery 110 is mounted, and the information related to the writing speed of the storage medium 105 is read out. Then, the performance as to the writing speed of the storage medium 105 is determined, and in a case where the writing speed does not satisfy the recording rate performance of the camera 100, the warning may be issued.

Accordingly, with this configuration, at a time before the user turns on the power source of the camera 100 for the image pickup, and also at a time before the user brings the camera 100 to the outside, it may be possible for the user to know that the recording performance of the storage medium 105 is not sufficient.

Thus, by adopting the above-described configuration, it may be possible for the user to avoid a situation where the image pickup fails because the recording performance of the storage medium 105 is not sufficient.

It is conceivable that there may be many situations where the user brings the camera 100 to which the charged battery 110 is mounted, to the outside. In view of the above-described circumstances, the camera 100 described according to the present embodiment provides the advantage in which before a problem occurs, the user may be notified that the recording performance of the storage medium 105 is not sufficient.

Next, a ninth embodiment of the present invention will be described. According to the present embodiment, the following processing of the camera 100 will be described. That is, at a time when the connection with the external device 116 is cancelled, the detection of the storage medium is performed, and the information related to the writing speed of the storage medium is read out. Then, the performance determination as to the writing speed is performed, and in a case where the writing speed does not satisfy the recording rate of the camera 100, a warning is issued. It is noted that aspects of the configuration of the camera according to the present embodiment may be similar to those of the first and fifth embodiments, and thus a detailed description is being omitted.

Figure 17:
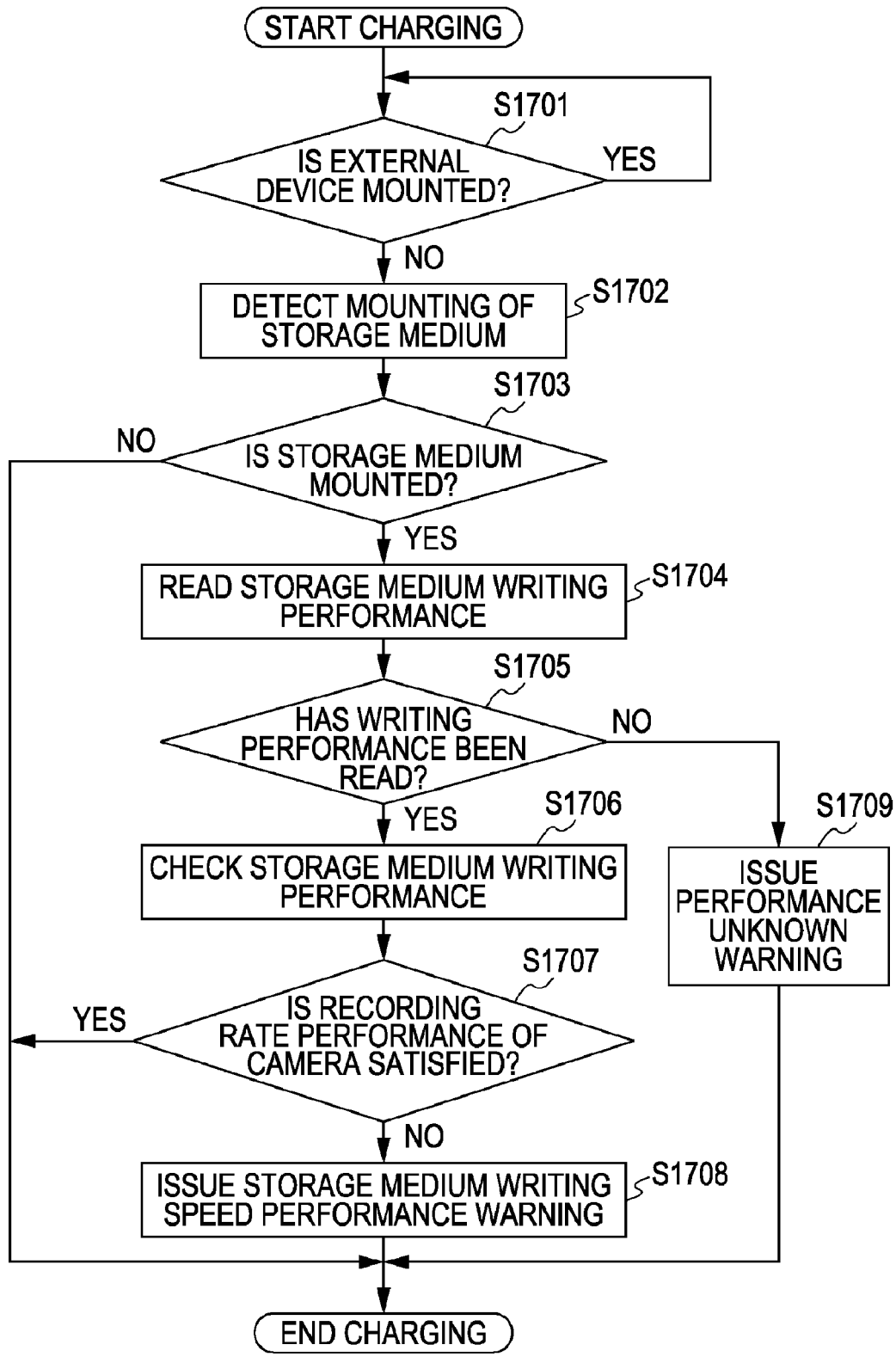
FIG. 17 is a flowchart for describing an embodiment of a processing sequence for, at a time when connection of the external device is cancelled from the digital camera according to an embodiment of the present invention, detecting the storage medium, reading out the information related to the writing speed of the storage medium, performing the performance determination as to the writing speed, and notifying a warning in a case where the writing speed does not satisfy a predetermined recording rate performance.

FIG. 17 is a flowchart for describing an embodiment of a process for issuing a warning in a case where the writing speed of the storage medium does not satisfy the recording rate performance of the camera 100, after the writing speed of the storage medium is read out at a time when the connection with the external device 116 is cancelled in the camera 100 according to the ninth embodiment.

First, in step S1701, the system controller 101 allows the external device connection detection unit 118 to check the connection state of the external device 116 (the port D (T1102)).

When the connection is established (the port D (T1102) is High) (YES in step S1701), the monitoring on the connection state of the external device 116 is continued. When the connection is not established (the port D (T1102) is Low) (NO in step S1701), processing advances to step S1702, as it is determined that the connection of the external device 116 is cancelled, and the system controller 101 allows the storage medium detection unit 106 to check the mounting state of the storage medium 105.

Next, processing advances to step S1703, where the system controller 101 determines whether the storage medium 105 is mounted. In a case where the storage medium 105 is not mounted (NO in step S1703), the processing is ended. On the other hand, in a case where the storage medium 105 is mounted (YES in step S1703), the processing is advanced to step S1704, where the system controller 101 reads out the performance information related to the writing speed of the storage medium 105 via the storage medium interface 104.

Next, processing advances to step S1705, where the system controller 101 determines whether the performance information related to the writing speed has been read out in step S1704. In a case where the performance information has been read out (YES in step S1705), the processing is advanced to step S1706, and in a case where the performance information has not been read out (NO in step S1705), the processing is advanced to step S1709.

In step S1706, the system controller 101 checks the read performance information related to the writing speed. Subsequently, processing advances to step S1707, where the system controller 101 determines whether the writing speed performance satisfies a predetermined performance. Then, in a case where the writing speed performance satisfies the predetermined performance (YES in step S1707), the processing is ended. In a case where the writing speed performance does not satisfy the predetermined performance (NO in step S1707), processing advances to step S1708, where the user is notified that the writing speed of the storage medium 105 does not satisfy the recording rate performance of the camera 100.

On the other hand, in a case where the performance information related to the writing speed has not been read out (NO in step S1705), processing advances to step S1709, where the user is notified that the writing speed of the storage medium 105 is unknown. It is noted that aspects of the notification method for the situation where the writing speed of the storage medium 105 does not satisfy the recording rate performance of the camera 100 may be similar to that of the seventh embodiment, and thus a description thereof is being omitted.

As described above, according to the present embodiment, at a time when the connection between the camera 100 and the external device 116 is cancelled, the detection of the storage medium 105 may be performed, and the information related to the writing speed of the storage medium 105 may be read out. Then, the performance determination as to the writing speed of the storage medium 105 is performed, and in a case where the writing speed does not satisfy the recording rate of the camera 100, the warning is issued.

Accordingly, with this configuration, at a time before the user turns on the power source of the camera 100 for the image pickup and also at a time before the user brings the camera 100 to the outside, it is possible for the user to know that the recording performance of the storage medium 105 is not sufficient.

Thus, by adopting the above-described configuration, it may be possible for the user to avoid a situation where the image pickup fails because the recording performance of the storage medium 105 is not sufficient.

The user may connect the camera 100 to the external device 116 such as a PC to perform the data back-up processing. When consideration is given to this case, there may be many situations where the user detaches the camera 100 from the external device 116 and brings the camera 100 to the outside. In view of the above-described circumstances, the camera 100 described according to the present embodiment provides the advantage in which before a problem occurs, the user may be notified that the recording performance of the storage medium 105 is not sufficient.

Figure 18:
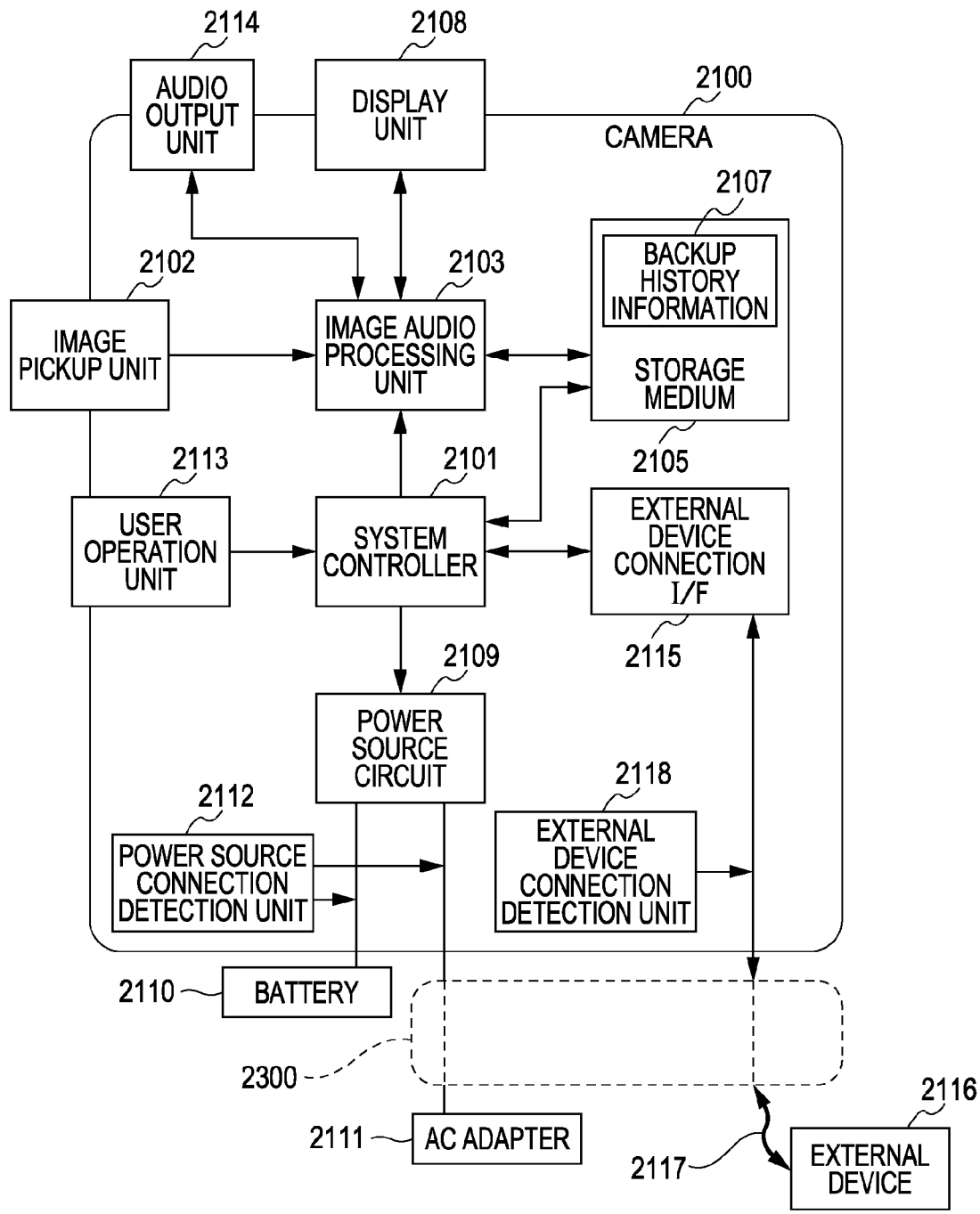
FIG. 18 illustrates a system configuration of the digital camera according to an embodiment of the present invention.

FIG. 18 illustrates an embodiment of a system configuration of a digital camera 2100 (hereinafter, referred to as camera 2100) functioning as an image pickup apparatus, which is provided with an information recording apparatus according to a tenth embodiment of the present invention. The camera 2100 comprises a system controller 2101 that functions as a control unit arranged to control an entire system and a block for processing the respective functions.

In the block illustrated in FIG. 18, an image pickup unit 2102 comprises an optical system, a motor for controlling the optical system, an image pickup element, and the like. The image pickup unit 2102 forms an optical image and performs photoelectric conversion. An image audio processing unit 2103 is arranged to convert an electric signal from the image pickup unit 2102 into digital data. A storage medium 2105 comprises, for example a flash memory or the like, and can perform random accesses. The storage medium 2105 records the digital data from the image audio processing unit 2103.

A display unit 2108 comprises, for example, a TFT, a LCD, or the like, and is arranged to display, e.g., a video or the like captured by the image pickup unit 2102. A power source circuit 2109 is arranged to supply electric power sufficient for the operation of the camera 2100 from a battery 2110 or an AC adapter 2111 into the camera 2100. A power source connection detection unit 2112 can detect the mounting state of the battery 2110 and the AC adapter 2111. It is noted that the power source connection detection unit 2112 as depicted corresponds to an example of a suitable configuration of a power source detection unit according to an embodiment of the present invention.

A user operation unit 2113 may enable various operations of the camera 2100 by the user. An audio output unit 2114 can output a warning for informing the user of the state of the inside of the camera 2100 and an audio at the time of video reproduction. In addition, the warning and the state of the inside of the camera 2100 can also be displayed on the display unit 2108. It is noted that the audio output unit 2114 and the display unit 2108 as depicted correspond to an example of a suitable configuration of a notification unit according to an embodiment of the present invention.

An external device connection interface 2115 for performing a connection to the outside connects an external device 2116 and the camera 2100 via a communication cable 2117 in the present drawing. An external device connection detection unit 2118 is adapted to detect the connection state of the camera 2100 with the external device 2116. It is noted that the external device connection detection unit 2118 as depicted corresponds to an example of a suitable configuration of an external device connection detection unit according to an embodiment of the present invention.

A cradle 2300 is arranged to facilitate the connection between the connection terminal of the AC adapter 2111 and the connection terminal of the external device 2116.

In one embodiment, when the video is recorded by using the above-described camera 2100, first, outside light transmitting through an optical system in the image pickup unit 2102 forms an optical image on a surface of an image pickup element, which is converted into an electric signal by the image pickup element. The electric signal may be converted by the image audio processing unit 2103 into digital data and the digital data may be recorded on the storage medium 2105. Also, when the digital data recorded on the storage medium 2105 is reproduced, the data read out from the storage medium 2105 may be converted in to data which is optimal for the display in the image audio processing unit 2103, and thereafter, displayed in the display unit 2108.

In addition, as described above, in one embodiment the camera 2100 has the power source circuit 2109 built therein. The power source circuit 2109 can supply electric power for operating the camera 2100 from either side of the detachably mountable battery 2110 or the AC adapter 2111 for converting a commercial power source into direct current. Then, the electric power at a plurality of voltage values generated in the power source circuit 2109 is supplied to an IC in the system. Furthermore, the power source circuit 2109 can charge the battery 2110 by using a built-in charging circuit 2202. It is noted that a detail of the power source circuit 2109 will be described below.

Also, in the camera 2100, in a case where the digital data recorded on the storage medium 2105 is sent to the external device 2116 or the like, the situation where the digital data is sent, for example, is recorded in a backup history information 2107. A detail of the backup history information 2107 will be described below.

Figure 19:
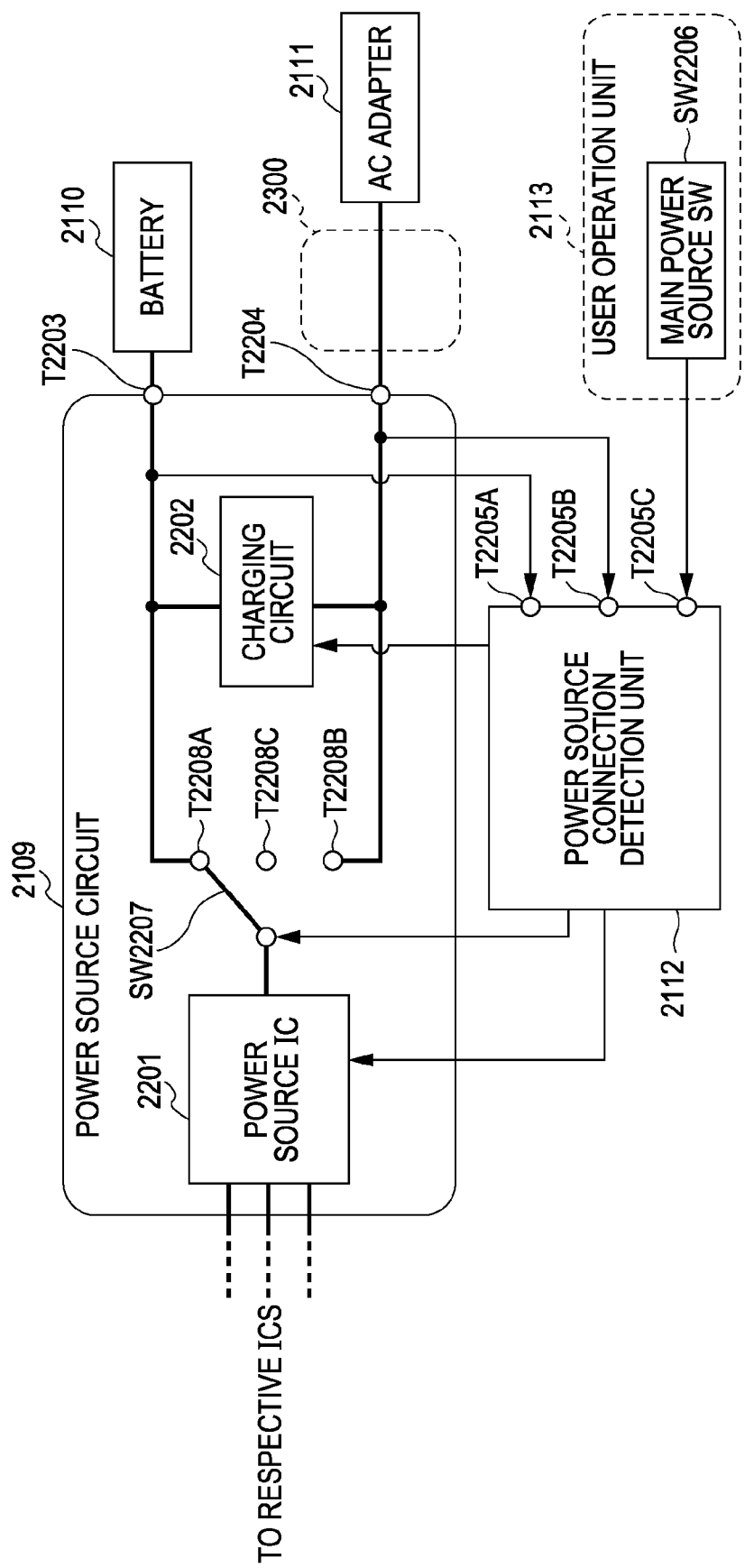
FIG. 19 is an explanatory diagram for describing a power source circuit of the digital camera according to an embodiment of the present invention.

Next, an embodiment of a detailed configuration and operation of the power source circuit 2109 will be described by using FIG. 19. The power source circuit 2109 includes a power source IC 2201 adapted to generate the respective voltages and the charging circuit 2202, and is connected to the power source connection detection unit 2112 described above. The battery 2110 supplies electric power while being connected (mounted) to a connection part A (T2203) in the power source circuit 2109. The AC adapter 2111 supplies electric power from the outside while being connected via cradle 2300 to a connection part B (T2204) in the power source circuit 2109.

The power source connection detection unit 2112 detects the connection state of the respective power sources in accordance with a voltage state of the bus which connects the power source circuit 2109 and the battery 2110 and the AC adapter 2111. In a case where the voltage is applied to the bus (that is, in a case where the connection of the power source is established), the voltage state is High. In a case where the voltage is not applied to the bus (that is, in a case where the connection of the power source is cancelled), the voltage state is Low. Then, as a signal in accordance with the voltage state is input to a port A (T2205A) and a port B (T2205B) of the power source connection detection unit 2112, the power source connection detection unit 2112 detects the connection state of the power source. It is noted that on the basis of the signal input to the port A (T2205A), the connection or cancellation of the battery 2110 is detected, and on the basis of the signal input to the port B (T2205B), the connection or cancellation of the AC adapter 2111 is detected. Also, a main power source switch (SW2206) in the user operation unit 2113 is connected to a port C (T2205C) of the power source connection detection unit 2112. In the main power source switch (SW2206), when the SW 2206 is turned ON, the voltage state is High, and when the SW 2206 is turned OFF, the voltage state is Low. With this configuration, the power source connection detection unit 2112 detects the state of the main power source switch (SW2206). It is noted that in the main power source switch (SW2206), it is possible to switch over the recording mode, the reproduction mode, the stop mode, and the like in accordance with the operation performed by the user.

The power source connection detection unit 2112 also performs a switching operation of a power source selection switch (SW2207) through a determination related to the information on the above-described ports A to C. A relation between the state of the ports A to C and a terminal to be selected by the power source selection switch (SW2207) is illustrated in FIG. 3. In FIG. 3, in a case where the battery 2110 is connected and the AC adapter 2111 is not connected while the main power source switch (SW2206) is in an ON state, the camera 2100 is driven by the battery. The power source selection switch (SW2207) is connected to a terminal A (T2208A).

In addition, in a case where the battery 2110 is not connected and the AC adapter 2111 is connected while the main power source switch (SW2206) is in the ON state, the camera 2100 is driven by the AC adapter power source. The power source selection switch (SW2207) is connected to a terminal B (T2208B).

In addition, in a case where the battery 2110 is connected and the AC adapter 2111 is connected while the main power source switch (SW2206) is in an OFF state, the power source selection switch (SW2207) is connected to a neutral terminal C (T2208C). In this case, the charging mode is established in which the battery 2110 is charged by way of the power source of the AC adapter 2111.

Next, a relation between the state of the ports A to C and the terminal to be selected by the power source selection switch (SW2207) in a state where charging of the battery 2110 is completed is illustrated in FIG. 4. In FIG. 4, in a case where the battery 2110 is connected and the AC adapter 2111 is not connected while the main power source switch (SW2206) is in the OFF state, the power source selection switch (SW2207) is connected to the terminal A (T2208A).

In addition, in a case where the battery 2110 is not connected and the AC adapter 2111 is connected while the main power source switch (SW2206) is in the OFF state, the power source selection switch (SW2207) is connected to the terminal B (T2208B).

In addition, in a case where the battery 2110 is connected and the AC adapter 2111 is connected while the main power source switch (SW2206) is in the OFF state, the power source selection switch (SW2207) is connected to the terminal B (T2208B).

As described above, according to the present embodiment, it is possible to switch over the electric power source from two or more power sources, and the connection state of the power source is detected on the basis of the voltage of the bus. In addition to the above-described mode, such a method may be adopted that a mechanical switch is provided to the connection part A (T2203) and the connection part B (T2204) to detect the connection of the power source on the basis of the switch state.

Next, FIG. 20 is an explanatory diagram for describing an embodiment of a format of the backup history information 2107 described above. According to the present embodiment, at a time where one image file to be recorded on the storage medium 2105 after the image pickup is created, the system controller 2101 creates the one backup history information 2107 to be recorded on the storage medium 2105. Also, each time a predetermined process such as a transfer of the image file recorded on the storage medium 2105 is performed, the system controller 2101 updates the backup history information 2107. Hereinafter, the detail of an embodiment of the backup history information 2107 will be described. It is noted that a recording processing performed each time the backup history information 2107 created and recorded by the system controller 2101 is updated corresponds to a processing example of a history information recording unit according to an embodiment of the present invention.

In one embodiment, the backup history information 2107 is composed, as illustrated in FIG. 20, of an image file name 2501, a transfer state 2502, a transfer destination path 2503, and a transfer date time 2504.

The image file name 2501 indicates a name of the image file created from the image pickup.

The transfer state 2502 indicates a transfer state of the image file. To be more specific, in one version, the transfer state 2502 comprises a flag indicating whether the image file has been transferred to the outside or has not been transferred yet, a flag indicating whether the user checks that the image file has been transferred, and a flag indicating whether the image file is protected to be in an undeletable state.

The transfer destination path 2503 indicates a transfer destination including an address of a device at the transfer destination. The external device 2116 where the data is backed up may comprise various devices including, but not limited to, a personal computer, an HDD (Hard Disk Drive) recorder, a NAS (Network Attached Storage), and the like. Depending on the device at the transfer destination, a backup method for the information of the camera 2100 may also include various methods.

The transfer date time 2504 may indicate a date and a time when the camera 2100 transfers the image file to the external device 2116.

In one version of a backup history information 2107 comprising these elements, each time a predetermined process is performed, for example, the image file name is identified by the user or the image file is transferred, the respective elements are updated by the system controller 2101. It is noted that according to the present embodiment, in the transfer state 2502, in a case where the flag indicating that the image file has been transferred exists, it may be determined that the image file has been backed up (outputted). In addition, the creation of the backup history information 2107 may be performed by the camera 2100, or may be performed by the external device 2116 and recorded by the camera 2100 while being sent through a communication function with the camera 2100, and other suitable methods may also be adopted to realize the creation.

Next, a description will be provided of an embodiment of processing of the camera 2100 for notifying the user that the backed-up data exists at a time when the AC adapter 2111 is detached while the battery 2110 is being charged or after the charging is ended.

Figure 21:
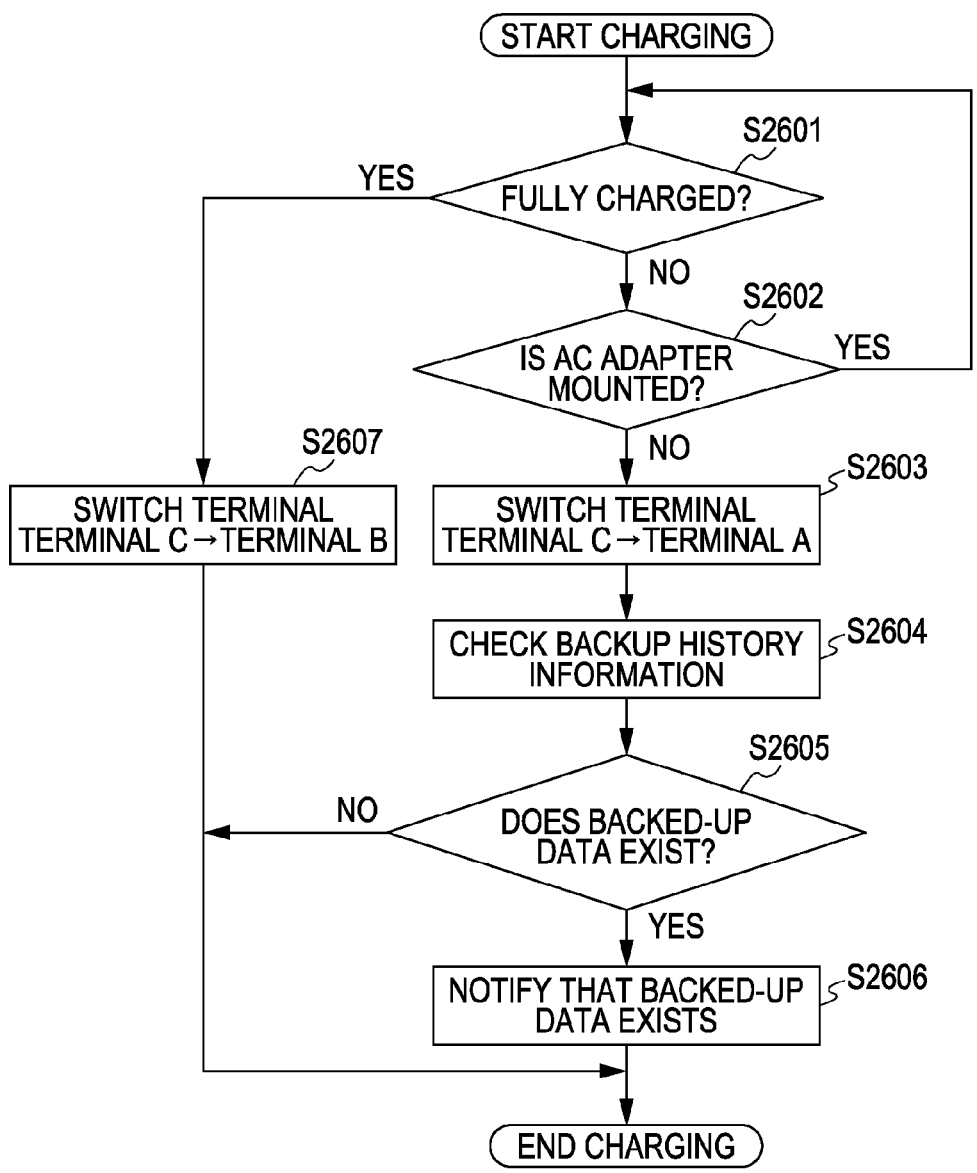
FIG. 21 is a flowchart for describing an embodiment of a processing sequence for notifying that a backed-up image exists in a case where the AC adapter is detached while the digital camera according to an embodiment of the present invention is being charged.

FIG. 21 is a flowchart for describing the processing sequence in a case where the AC adapter 2111 is detached while the battery 2110 is being charged.

First, in step S2601, the system controller 2101 is adapted to monitor the charging state after the charging start. When the battery is fully charged (YES in step S2601), processing advances to step S2607, where power source connection detection unit 2112 switches the power source selection switch (SW2207) from the terminal C to the terminal B to end the charging. That is, the mode is switched from the charging mode to the AC adapter power source drive.

When the charging is not yet ended (NO in step S2601), processing advances to step S2602, where the system controller 2101 allows the power source connection detection unit 2112 to check the mounting state of the AC adapter 2111 (the state of the port B).

In step S2602, when the AC adapter 2111 is mounted (YES in step 2602), the processing is returned to the charging state check in step S2601. On the other hand, when the AC adapter 2111 is not mounted (NO in step S2602), it is determined that the AC adapter 2111 is detached, and processing advances to step S603, where the system controller 2101 allows the power source connection detection unit 2112 to switch the power source selection switch (SW2207) from the terminal C to the terminal A. That is, the mode is switched to the battery drive. In this manner, according to the present embodiment, in accordance with the detection result of the power source connection detection unit 2112, the power source selection switch (SW2207) is switched over.

Next, processing advances to steps S2604 and S2605, where the system controller 2101 checks the update of the backup history information 2107, which corresponds to a processing example of a history information checking unit according to an embodiment of the present invention. Herein, the backup history information 2107 is checked to determine whether the image file transferred to the outside exists, that is, the backed-up image file exists. Then, as a result of the checking, in a case where the backed-up image file does not exist (NO in step S2605), charging is ended. On the other hand, in a case where the backed-up image file exists (YES in step S2605), processing advances to step S2606, where the user is notified that the backed-up image file exists.

Figure 22:
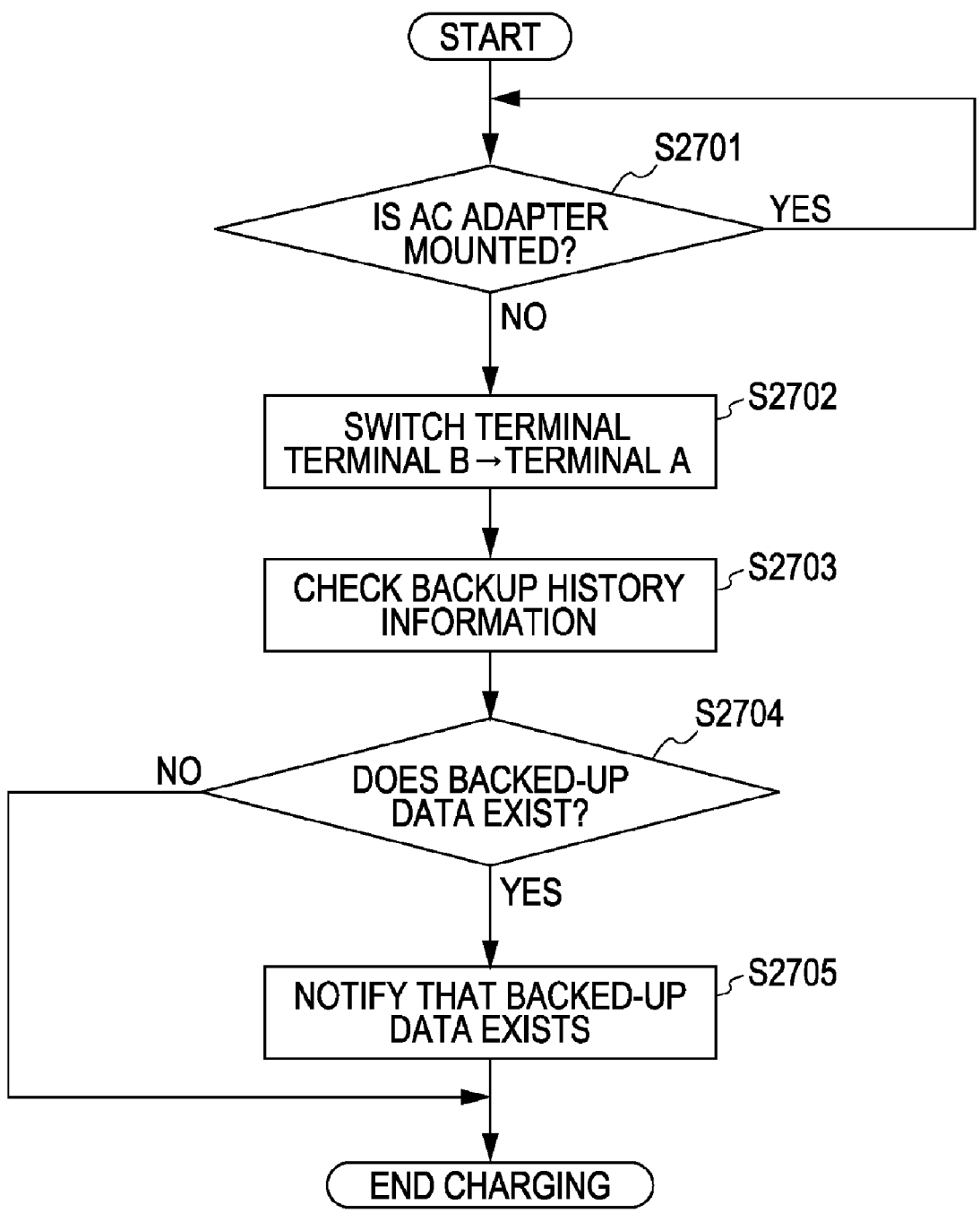
FIG. 22 is a flowchart for describing an embodiment of a processing sequence for notifying that a backed-up image exists in a case where the AC adapter is detached after the digital camera according to an embodiment of the present invention is charged.

Next, FIG. 22 is a flowchart for describing an embodiment of a process sequence in a case where the AC adapter 2111 is detached after the charging is ended.

First, in step S2701, the system controller 2101 allows the power source connection detection unit 2112 to check the mounting state of the AC adapter 2111. When the AC adapter 2111 is mounted (YES in step S2701), monitoring of the mounting state of the AC adapter 2111 is continued. On the other hand, when the AC adapter 2111 is not mounted (NO in step S2701), it is determined that the AC adapter 2111 is detached, and processing advances to step S2702, where the power source connection detection unit 2112 switches the power source selection switch (SW2207) from the terminal B to the terminal A. That is, the mode is switched to the battery drive.

Next, processing advances to steps S2703 and S2704, where similarly to steps S2603 and S2604, the system controller 2101 checks the backup history information 2107, which corresponds to a processing example of the history information checking unit according to an embodiment of the present invention. Then, as a result of the checking, in a case where the backed-up image file does not exist (NO in step S2704), the charging is ended. On the other hand, in a case where the backed-up image file exists (YES in step S2704), processing advances to step S2705, where the user is notified that the backed-up image file exists.

Here, an embodiment of a method for notifying the user that the backed-up image file (data) exists (that is, examples of specific modes in steps S2606 and S2705 described above) will be described.

The camera 2100 has the audio output unit 2114 adapted to output the audio, and with this configuration, it is possible to urge the user to pay attention while the buzzer or the warning alarm is output. In addition to the above, it may be possible to notify the user that the backed-up data exists through an audio guidance previously stored in the internal storage medium of the camera 2100, for example, "backed-up data exists".

In addition, the camera 2100 has the display unit 2108, and it may be possible to urge the user to pay attention by temporarily displaying a message on the display unit 2108 or flashing a display unit (light emitting unit) (not shown) for informing the internal state of the camera 2100.

Figure 23:
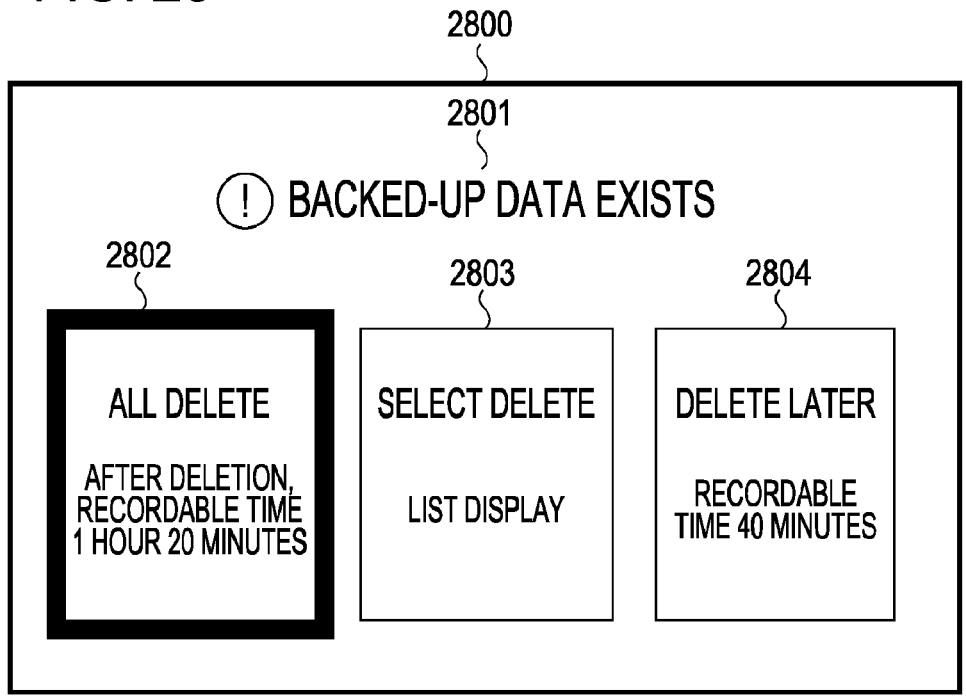
FIG. 23 illustrates an example of a display screen displayed by the digital camera according to an embodiment of the present invention in a case where backed-up data exists.

Also, a user interface, an embodiment of which is illustrated in 2800 FIG. 23, may be activated to display a text message 2801 to notify the user that the backed-up data exists in the display unit 2108 and at the same time, a button or the like for deleting the backed-up image may be displayed.

In FIG. 23, in a case where an all delete button 2802 is selected in the user operation unit 2113, the transferred images can be collectively deleted. In a case where a select delete button 2803 is selected, the user can selectively delete the backed-up image. In a case where a button 2804 is selected, the deletion is not performed at this time, but the deletion can be performed later.

Also, as illustrated in the present drawing, in a case where the operation of the above-described respective buttons is performed, by displaying an estimate of the recordable time after the operation (e.g., after the deletion) of the storage medium 2105, it is possible to provide the user with determination information for performing the deletion. It is noted that the recordable time is displayed in the embodiment as shown, but the specific storage capacity may also be displayed.

Figure 24:
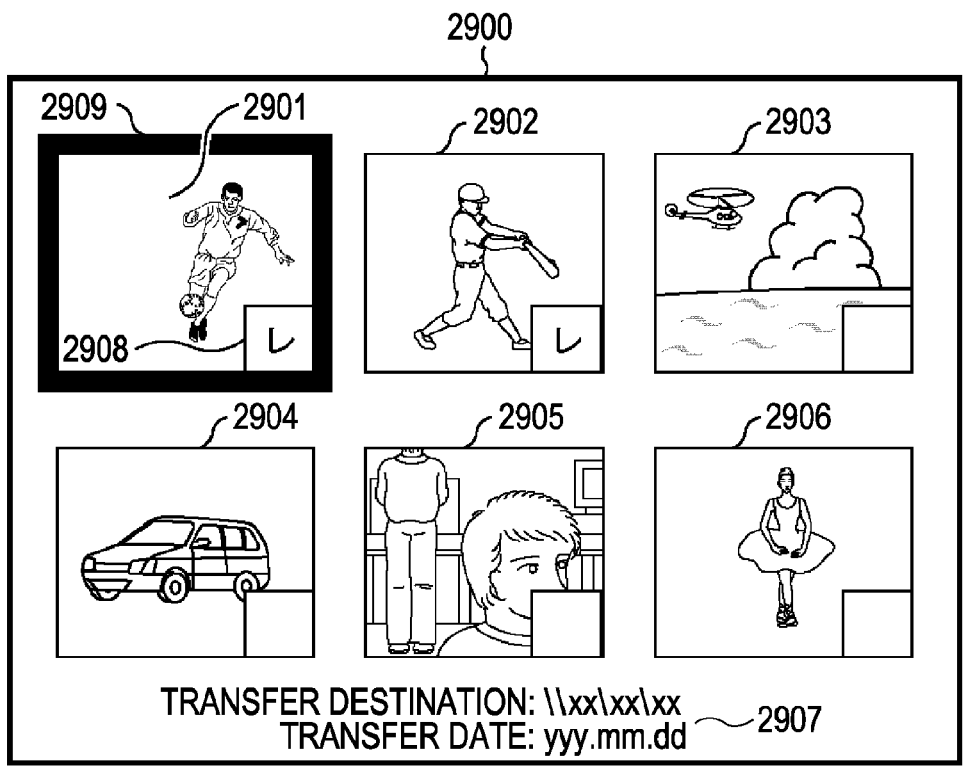
FIG. 24 illustrates an example of a display screen displayed by the digital camera according to an embodiment of the present invention when a selection deletion is performed in a case where the backed-up data exists.

In a case where the select delete button 2803 is selected, in one embodiment an image 2900 illustrated in FIG. 24 is displayed. In FIG. 24, transferred images 2901 to 2906 are displayed in a list, and an image selection unit 2908 composed of a check box or the like, and information 2907 such as the transfer destination and the transfer date are displayed for the selected image. Furthermore, a cursor 2909 for the user to select the image may be displayed. Then, in a case where the user performs the deletion selection, in the image selection unit 2908 composed of the check box, a mark such as "tick" may be displayed to permit the deletion. In one version according to this manner, by adopting a touch panel provided with both the functions of the display unit 2108 and the user operation unit 2113, the user can perform the operation more intuitively. It is noted that the operation performed at this time may be recorded in the backup history information 2107.

It is noted that it is also possible for the user to arbitrarily cancel the above-described function of notifying that the backed-up data exists.

As described above, with the camera 2100 according to the present embodiment, the user can find out that the backed-up data exists in the camera 2100 at a time before the user turns on the power source of the camera 2100 for the image pickup, and also at a time before the user brings the camera 2100 to the outside.

Then, after the user finds out that the backed-up data exists, as the user deletes the data, it may be possible to avoid the situation where the free space of the storage medium 2105 runs out during the image pickup and the image pickup cannot be continued. In addition, it may be possible to avoid the situation where the recorded image needs to be deleted, although reluctantly, for securing the free space of the storage medium. Thus, it may be possible to avoid the situation where the battery is consumed wastefully while the user is away from home or the image wished to be recorded needs to be deleted.

In particular, it may be the case that the power source is supplied via the AC power supply in a situation where the camera is used or charged in the house, and the power source is supplied from the battery 2110 while being cut off from the AC power source when the camera is used outside the house. In view of the above-described circumstances, the camera 2100 described according to the present embodiment provides the advantage in which before the problem occurs, the user may be appropriately informed of the timing for deleting the backed-up image data.

It is noted that according to the above-described embodiment, the description has been provided that when the connection from the AC adapter functioning as the external device is cut off in step S2701, it is determined whether the data backed up to the external device exists, but furthermore, in a case where the remaining capacity amount of the memory is decreased to a certain level, such processing may also be performed.

In one version, the following mode may be convenient. In a case where the disconnection from the external device is detected, the remaining capacity amount of the storage medium and whether the data backed up to the external device exists in the data recorded on the storage medium may be checked. In a case where the remaining capacity amount is smaller than the predetermined reference value and also the data backed up to the external device exists, the above-described notification may be performed.

Next, an eleventh embodiment of the present invention will be described. According to the present embodiment, a description will be provided of the processing of the camera 2100 for notifying the user that the backed-up data exists at a time when the connection with the external device 2116 is cancelled. It is noted that aspects of the configuration of the camera according to the present embodiment may be similar to that of the tenth embodiment, and thus a detailed description is being omitted.

Figure 25:
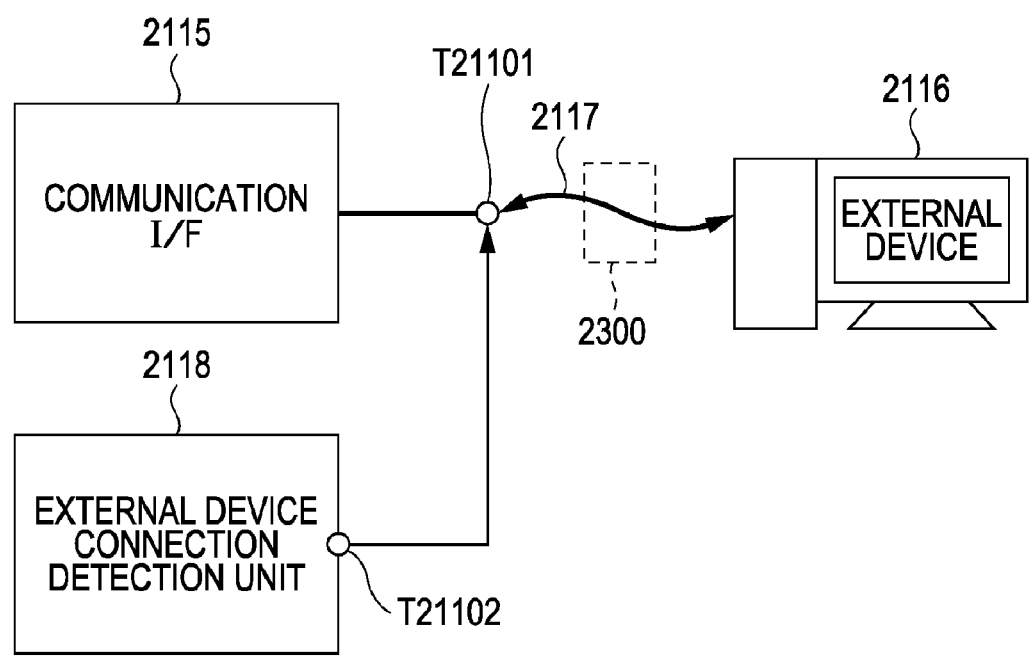
FIG. 25 is an explanatory diagram for describing an external device connection detection unit of the digital camera according to an embodiment of the present invention.

FIG. 25 is an explanatory diagram for describing an embodiment of a detail of the external device connection detection unit 2118. The external device connection interface 2115 is connected via an external device connection part (T21101) to the external device connection detection unit 2118. Also, the external device 2116 is connected via the cradle 2300 to the external device connection part (T21101), and the communication cable 2117 is used for these connections.

The external device connection detection unit 2118 is adapted to monitor the supply voltage state of the communication bus which connects the above-described respective units. In a case where the external device 2116 is connected, the voltage state of a port D (T21102) is High, and in a case where the external device 2116 is not connected, the voltage state is Low. Therefore, by detecting the voltage state, the external device connection detection unit 2118 determines the connection state of the external device 2116.

It is noted that herein, the external device connection detection may be determined on the basis of the supply voltage of the communication bus, but a method may also be adopted of detecting the external device connection on the basis of a state of a mechanical switch provided to the external device connection part (T21101).

FIG. 26 is a flowchart for describing an embodiment of a process sequence for notifying the user that the backed-up data exists at a time when the connection with the external device 2116 is cancelled in the camera 2100 according to the eleventh embodiment.

First, in step S21101, the system controller 2101 allows the external device connection detection unit 2118 to check the connection state of the external device 2116 (the port D (T21102)).

When the external device 2116 is connected (the port D (T21102) is High) (YES in step S21101), the monitoring on the connection state of the external device 2116 is continued. When the external device 2116 is not connected (the port D (T21102) is Low) (NO in step S21102), processing advances to step S21102, and the system controller 2101 determines that the connection of the external device 2116 is cancelled. Then, in step S21102, the update of the backup history information 2107 is checked, which corresponds to a processing example of a history information checking unit according to an embodiment of the present invention. Herein, the backup history information 2107 is checked to determine whether the image file transferred to the outside exists, that is, the backed-up image file exists.

Next, processing advances to step S21103 where, as a result of the checking, in a case where the backed-up image file does not exist (NO in step S21103), the system controller 2101 ends the processing. In a case where the backed-up image file exists (YES in step S21103), the processing is advanced to step S21104, where the system controller 2101 notifies the user that the backed-up image file exists.

It is noted that, in one embodiment, the method of notifying the user that the backed-up image file exists may be similar to that of the above-described embodiments, and thus a description thereof is being omitted.

As described above, with the camera 2100 according to the eleventh embodiment, the user can find out that the backed-up image exists on the storage medium 2105 in the camera 2100 at a time before the user turns ON the power source of the camera 2100 for the image pickup.

Then, after the user finds out that the backed-up data exists, as the user deletes the data, it may be possible to avoid the situation where the free space of the storage medium 2105 runs out during the image pickup and the image pickup cannot be continued. In addition, it may be possible to avoid the situation where the recorded image needs to be deleted, although reluctantly, for securing the free space of the storage medium. Thus, it may be possible to avoid the situation where the battery is consumed wastefully while the user is away from home or the image wished to be recorded needs to be deleted.

In particular, in one embodiment, in the camera 2100, for backing up the images, the connection to the external device 2116 is established. However, when the data amount of the images is extremely large, for example, the backup operation may take time. For that reason, during the backup operation, for example, the user may leave the camera 2100 and may forget about the backup operation. In view of such a situation, when the connection with the external device 2116 is cancelled, if the user is notified that the backed-up data exists, it may be possible for the user to remember that the backup operation has been performed. Along with the notification, it may be possible to urge the user to delete the backed-up data. That is, the camera 2100 described according to the present embodiment provides the advantage in which before a problem occurs, the user may be appropriately notified of a time for deleting the backed-up image data.

It is noted that according to the above-described embodiments, the description has been provided of the example in which the information recording apparatus of the present invention is applied to the digital camera functioning as the image pickup apparatus, but the present invention is not limited to the application to the information recording apparatus. For example, the present invention can also be suitably applied to a portable device brought to the outside, an operation of which is limited when the storage medium is not mounted or the remaining capacity amount of the storage medium is not sufficient. In addition, for example, the present invention can be suitably applied to a portable device brought to the outside, an operation of which is limited depending on the capacity of the storage medium or the power source state. A specific example includes, for example, a mobile phone, a PDA provided with a camera function, and the like. In addition, the present invention can of course embody an information recording apparatus having a plurality of functions which are the main points of the present invention described according to the first to eleventh embodiments.

It is noted that in order to realize the present invention, it is possible to use a storage medium on which a program code (computer program) of software is stored that realizes the functions of the above-described embodiments. In this case, the storage medium may be supplied to a system or an apparatus, and the computer-executable instructions in the program code stored on the storage medium are read out and executed by a computer (or a CPU or an MPU) of the system or the apparatus, thereby achieving the functions of the above-described embodiments of the present invention.

In one version, the program code itself as read out from the storage medium may realize the functions of the above-described embodiments, and the program code itself and the storage medium on which the program code is stored may constitute the present invention.

As the storage medium for supplying the program code, for example, a flexible disk, a hard disk drive, an optical disk, an opto-magnetic disk, a CD-R, a magnet tape, a non-volatile memory card, a ROM, or the like can be used.

In addition, in one version a part or all of the actual process is performed by an OS (a basic system or an operation system) or the like which is running on the computer on the basis of an instruction of the program code.

Furthermore, in one embodiment, the program code read out from the storage medium may be written in a memory that is provided to a function expansion board inserted in the computer or a function expansion unit connected to the computer. In this case, on the basis of the instruction of the program code, a CPU or the like provided to the function expansion board or the function expansion unit may perform a part or all of the actual process.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-292484 filed Nov. 9, 2007 and No. 2007-292485 Nov. 9, 2007, which are hereby incorporated by reference herein in their entirety.

What is claimed is:

1. An information recording apparatus arranged to record information on a detachably mountable storage medium, the information recording apparatus comprising:
    a detection unit configured to detect a connection state of the information recording apparatus with an external device which is different from the detachably mountable storage medium;
    a storage medium detection unit configured to detect whether the storage medium is mounted on the information recording apparatus; and
    a notification unit configured to notify, in a case where the storage medium detection unit detects that the storage medium is not mounted on the information recording apparatus, that the storage medium is not mounted on the information recording apparatus in response to a detection by the detection unit that the external device is disconnected from the information recording apparatus.

2. The information recording apparatus according to claim 1, wherein the external device is a device for supplying electric power to the information recording apparatus.

3. The information recording apparatus according to claim 1, wherein, in a case where the storage medium detection unit detects that the storage medium is mounted on the information recording apparatus, the notification unit does not notify that the storage medium is mounted on the information recording apparatus in response to the detection by the detection unit that the external device is disconnected from the information recording apparatus.

4. An information recording apparatus arranged to record information on a detachably mountable storage medium, the information recording apparatus comprising:
   a detection unit configured to detect a connection state of the information recording apparatus with an external device which is different from the detachably mountable storage medium; and
   a storing medium remaining free space amount detection unit configured to detect a remaining free space amount of the mounted storage medium, and
   a notification unit configured to make a notification regarding a remaining free space amount of the storage medium in response to a detection by the detection unit that the external device is disconnected from the information recording apparatus, in a case where the storage medium remaining free space amount detection unit detects that the remaining free space amount of the storage medium is smaller than a predetermined value.

5. The information recording apparatus according to claim 4, wherein the external device is a device for supplying electric power to the information recording apparatus.

6. The information recording apparatus according to claim 4, wherein, in a case where the remaining free space amount of the storage medium detected by the storage medium remaining free space amount detection unit is larger than the predetermined value, the notification unit does not make the notification regarding the remaining free space of the storage medium in response to the detection by the detection unit that the external device is disconnected from the information recording apparatus.

7. A method of recording information with an information recording apparatus on a detachably mountable storage medium, the method comprising:
   detecting a connection state of the information recording apparatus with an external device which is different from the detachably mountable storage medium;
   detecting whether the storage medium is mounted on the information recording apparatus; and
   notifying, in a case where it is detected that the storage medium is not mounted on the information recording apparatus, that the storage medium is not mounted on the information recording apparatus in response to a detection that the external device is disconnected from the information recording apparatus.

8. A method of recording information with an information recording apparatus on a detachably mountable storage medium, the method comprising:
   detecting a connection state of the information recording apparatus with an external device which is different from the detachably mountable storage medium;
   detecting a remaining free space amount of the mounted storage medium; and
   making a notification regarding a remaining free space amount of the storage medium in response to a detection that the external device is disconnected from the information recording apparatus, in a case where it is detected that the remaining free space amount of the storage medium is smaller than a predetermined value.

* * * * *